United States Patent [19]

Bozzelli et al.

[11] Patent Number: 4,482,771
[45] Date of Patent: Nov. 13, 1984

[54] ANIONIC POLYMERIZATION OF CIS- AND TRANS-1,3-PENTADIENE FROM A MIXTURE OF SATURATED AND UNSATURATED HYDROCARBONS

[75] Inventors: John W. Bozzelli; Kent S. Dennis; Felipe A. Donate, all of Midland, Mich.

[73] Assignee: The Dow Chemical Company, Midland, Mich.

[21] Appl. No.: 559,525

[22] Filed: Dec. 8, 1983

Related U.S. Application Data

[63] Continuation-in-part of Ser. No. 455,146, Jan. 3, 1983, abandoned.

[51] Int. Cl.$^3$ ............................ C07C 1/16; C07C 2/74; C07C 2/02
[52] U.S. Cl. .................................... 585/10; 585/18; 585/255; 585/507; 585/520
[58] Field of Search ............... 585/255, 507, 520, 10, 585/18; 526/173

[56] References Cited

U.S. PATENT DOCUMENTS

| | | | |
|---|---|---|---|
| 2,023,793 | 12/1935 | Scott | 260/168 |
| 2,398,973 | 4/1946 | Suday | 260/681.5 |
| 2,753,325 | 7/1956 | Banes et al. | 260/82 |
| 2,753,382 | 7/1956 | Hammer | 260/666 |
| 2,985,594 | 5/1961 | Zimmerman | 252/431 |
| 3,105,828 | 10/1963 | Porter | 260/83.7 |
| 3,306,949 | 2/1967 | Mertzweiller et al. | 260/680 |
| 3,324,191 | 6/1967 | Wofford | 260/669 |
| 3,331,826 | 7/1967 | Talcott | 260/94.2 |
| 3,360,580 | 12/1967 | Mertzweiller et al. | 260/569 |
| 3,458,491 | 7/1969 | Dennis | 260/94.2 |
| 3,505,304 | 4/1970 | Davidson et al. | 260/94.2 |
| 3,577,398 | 5/1971 | Pace et al. | 260/85.3 |
| 3,647,913 | 3/1972 | Lasis | 260/681.5 |
| 3,789,090 | 1/1974 | Otsuki et al. | 260/669 P |
| 3,792,105 | 2/1974 | Siegmann | 260/681.5 R |
| 4,060,492 | 11/1977 | Yasui | 252/59 |
| 4,313,019 | 1/1982 | Hara et al. | 585/429 |
| 4,337,329 | 6/1982 | Kubo et. al. | 525/399 |

FOREIGN PATENT DOCUMENTS

| | | |
|---|---|---|
| 7343082 | 9/1969 | Japan . |
| 7209848 | 7/1972 | Netherlands . |
| 2092163 | 8/1982 | United Kingdom . |
| 670578 | 11/1977 | U.S.S.R. . |

OTHER PUBLICATIONS

"Chain Transfer in Anionic Polymerization", A. L. Gatzke, Journal of Polymer Science, Part A-1, vol. 7, 2281–2292, (1969).

*Primary Examiner*—Curtis R. Davis
*Attorney, Agent, or Firm*—Dan R. Howard

[57] ABSTRACT

1,3-Pentadiene is polymerized in an inert gaseous atmosphere from a mixture of saturated and unsaturated hydrocarbon molecules. At least 50 percent by weight of said molecules have 5 carbon atoms. An anionic polymerization initiator in conjunction with an organic polar solvent is used to effect polymerization. Cyclopentadiene, active hydrogen compounds and other polymerization-terminating compounds may be inactivated and separated from the mixture of hydrocarbon compounds before starting polymerization. As an alternative, inactivation and separation of cyclopentadiene, active hydrogen compounds and polymerization-terminating compounds may be omitted provided the anionic polymerization initiator is employed in an amount to (a) inactivate such compounds and (b) initiate polymerization of 1,3-pentadiene.

The polymer of 1,3-pentadiene so prepared is then hydrogenated or functionalized by further reaction.

35 Claims, No Drawings

ANIONIC POLYMERIZATION OF CIS- AND TRANS-1,3-PENTADIENE FROM A MIXTURE OF SATURATED AND UNSATURATED HYDROCARBONS

CROSS-REFERENCE TO RELATED APPLICATION

This application is a continuation-in-part of the co-pending application Ser. No. 455,146, filed Jan. 3, 1983, and now abandoned.

BACKGROUND OF THE INVENTION

This invention relates generally to anionic polymerization of 1,3-pentadiene (piperylene). The 1,3-pentadiene is generally in admixture with other saturated and unsaturated 5 carbon hydrocarbons. One source of such an admixture is a 5 carbon distillation cut obtained from a cracking of petroleum. This invention also relates to the polymer of 1,3-pentadiene so prepared. This invention further relates to a hydrogenated polymer of 1,3-pentadiene.

It has been found that 1,3-pentadiene does not necessarily polymerize under polymerization conditions where other conjugated dienes, such as isoprene and butadiene, polymerize readily. It has been found that an organic polar compound is required as a co-initiator with a number of known anionic polymerization catalysts in order to produce a discernible amount of polymer within a reasonable time. It has also been found that a pure, or substantially pure, 1,3-pentadiene monomer polymerization feed stream is not essential. In fact, only a few of the components in an impure five carbon atom hydrocarbon fraction need to be neutralized and/or removed prior to polymerization of 1,3-pentadiene from the hydrocarbon fraction.

Accordingly, a primary object is to anionically polymerize 1,3-pentadiene from a mixture of saturated and unsaturated hydrocarbons in a simple and economic manner. A suitable hydrocarbon mixture is a 5 carbon atom fraction obtained from a cracking of petroleum. A related object is to produce saturated synthetic oils by hydrogenating the anionically polymerized 1,3-pentadiene.

Other objects and advantages will appear in the more detailed description and examples set forth below. It is to be understood, however, that the more detailed description and examples are given by way of illustration and explanation only, and not by way of limitation. Various changes to the description and examples may be made by those skilled in the art without departing from the scope and spirit of the present invention.

SUMMARY OF THE INVENTION

Polymers of piperylene are prepared, in accordance with the present invention, from a mixture of saturated and unsaturated hydrocarbon compounds primarily containing 5 carbon atoms per molecule rather than from pure or substantially pure piperylene monomer. A suitable mixture is derived from a cracking of petroleum.

The mixture of saturated and unsaturated hydrocarbon compounds is first treated with an alkali metal to inactivate compounds which interfere with polymerization. Compounds which interfere with polymerization of 1,3-pentadiene include cyclopentadiene, active hydrogen compounds and other polymerization terminating compounds. The inactivated compounds and any remaining alkali metal are removed from the mixture to yield a treated polymerization feedstream. Those skilled in the art will recognize that some of the alkali metal will be contaminated with the inactivated compounds.

Cis- and trans-piperylene monomers contained in the treated polymerization feedstream are polymerized in the presence of an anionic polymerization initiator and, as an initiator-activator, an organic polar solvent. Those skilled in the art will recognize that other conjugated dienes such as isoprene will also be polymerized in the presence of an anionic polymerization initiator and an organic polar solvent.

As an alternative, the steps of inactivating and removing compounds which interfere with polymerization from the mixture of saturated and unsaturated compounds may be omitted if a sufficient amount of an anionic polymerization initiator is used in conjunction with the organic polar solvent. The sufficient amount is that amount which will inactivate the compounds which interfere with polymerization as well as initiate polymerization of piperylene monomer.

It has also been found that the aforementioned treated mixture will not polymerize at a practical rate in the presence of only an anionic polymerization initiator unless the initiator is an alkali metal-polycene complex or an addition compound of an alkali metal with alpha-methylstyrene. These initiators are normally prepared in an organic polar solvent. As such, an additional amount of polar solvent is unnecessary.

It has further been found that the treated mixture containing piperylene monomer can be distilled from a combination of the treated mixture and an initiator such as metallic sodium or n-butyllithium at atmospheric pressure. By way of contrast, isoprene and butadiene polymerize upon contact with metallic sodium even in the absence of an organic polar solvent.

In one aspect, the present invention is an anionic process for preparing polymers of 1,3-pentadiene from a mixture of saturated and unsaturated hydrocarbon molecules. At least 50 percent by weight of the molecules contain 5 carbon atoms per molecule. The mixture comprises cis-1,3-pentadiene, trans-1,3-pentadiene, cyclopentadiene and other 5-carbon atom molecules.

The process comprises three steps.

In a first step, the mixture of saturated and unsaturated hydrocarbon molecules is treated with an alkali metal. The treatment is sufficient to inactivate cyclopentadiene, active hydrogen compounds and other polymerization-terminating compounds, all of which are usually found in such mixtures of saturated and unsaturated hydrocarbon molecules.

In a second step, the inactivated compounds and any remaining alkali metal are removed from the treated mixture to yield a treated polymerization feedstream.

In a third step, polymerization of the cis- and trans-1,3-pentadiene contained in the treated polymerization feedstream is initiated by contacting, in an inert atmosphere, the treated polymerization feedstream with an initiator combination. The initiator combination comprises an organic polar solvent in conjunction with an anionic polymerization initiator. The anionic polymerization initiator is selected from the group consisting of alkali metals, dispersions of an alkali metal in an aliphatic hydrocarbon, and organo-alkali metal compounds.

Also within the scope of the present invention is the polymer of 1,3-pentadiene so prepared.

In a related aspect, the present invention is an anionic process for preparing polymers of 1,3-pentadiene from a mixture of saturated and unsaturated hydrocarbon molecules. At least 50 percent by weight of the molecules contain 5 carbon atoms per molecule. The mixture comprises cis-1,3-pentadiene, trans-1,3-pentadiene, cyclopentadiene and other 5-carbon atom molecules.

In accordance with the process, polymerization of cis- and trans-1,3-pentadiene is initiated by contacting, in an inert atmosphere, said mixture of saturated and unsaturated hydrocarbon molecules with an initiator combination.

The initiator combination comprises an organic polar solvent in conjunction with an anionic polymerization initiator. The anionic polymerization initiator is selected from the group consisting of alkali metals, dispersions of an alkali metal in an aliphatic hydrocarbon, and organoalkali metal compounds.

The initiator combination is employed in an amount sufficient to (a) inactivate the chain termination function of generally all (1) cyclopentadiene, (2) active hydrogen compounds and (3) other polymerization-terminating compounds contained in the mixture of saturated and unsaturated hydrocarbon molecules and (b) initiate polymerization of the cis- and trans-1,3-pentadiene contained in said mixture.

Also within the scope of the present invention is the polymer of 1,3-pentadiene so prepared.

In another aspect, the present invention is an anionic process for preparing polymers of 1,3-pentadiene from a mixture of saturated and unsaturated hydrocarbon molecules. At least 50 percent by weight of the molecules contain 5 carbon atoms per molecule. The mixture comprises cis-1,3-pentadiene, trans-1,3-pentadiene, cyclopentadiene and other 5-carbon atom molecules. The process comprises five steps.

In a first step, the mixture of saturated and unsaturated hydrocarbon molecules is treated with an alkali metal. The treatment is sufficient to inactivate cyclopentadiene, active hydrogen compounds and other polymerization-terminating compounds, all of which are usually found in such a mixture of saturated and unsaturated hydrocarbon molecules.

In a second step, the inactivated compounds and any remaining alkali metal are removed from the mixture of saturated and unsaturated hydrocarbons to yield a treated polymerization feedstream.

In a third step, the treated polymerization feedstream is divided into at least a first portion and a second portion. The second portion is suitably larger than the first portion.

In a fourth step, polymerization of the cis- and trans-1,3-pentadiene contained in the treated feedstream is initiated by contacting, in an inert atmosphere, the first portion of the treated polymerization feedstream with an initiator complex. The initiator complex comprises (1) a dispersion of an alkali metal in an aliphatic hydrocarbon in conjunction with (2) an organic polar solvent. A chain transfer agent may also be added to the first portion of the treated polymerization feedstream. The aliphatic hydrocarbon is selected from the group consisting of mineral oils having a boiling point in the range of from about 110° Centigrade to about 400° Centigrade and hydrogenated polypiperylenes.

In a fifth step, polymerization of the cis- and trans-1,3-pentadiene contained in the treated polymerization feedstream is continued by adding the second portion of the feedstream to the first portion thereof at a specific rate. The specific rate is that which is sufficient to attain and maintain steady reflux conditions within a polymerization vessel. The specific rate is continued until addition of the second portion is complete. If desired, a chain transfer agent can be added to the first portion concurrently with the second portion.

Also within the scope of the present invention is the polymer of 1,3-pentadiene so prepared.

In a related aspect, the present invention is a method for anionically preparing polymers of 1,3-pentadiene from a mixture of saturated and unsaturated hydrocarbon molecules. At least 50 percent by weight of the molecules contain 5 carbon atoms per molecule. The mixture comprises cis-1,3-pentadiene, trans-1,3-pentadiene, cyclopentadiene and other 5-carbon atom molecules. The method comprises three steps:

In a first step, the mixture of saturated and unsaturated hydrocarbon molecules is divided into at least a first portion and a second portion. The second portion is suitably larger than the first portion.

In a second step, polymerization of the cis- and trans-1,3-pentadiene contained in the mixture of saturated and unsaturated hydrocarbon molecules is initiated by contacting, in an inert atmosphere, the first portion of the mixture with an initiator complex. The initiator complex comprises (1) a dispersion of an alkali metal in an aliphatic hydrocarbon in conjunction with (2) an organic polar solvent. A chain transfer agent may also be added to the first portion of the mixture. The aliphatic hydrocarbon is selected from the group consisting of mineral oils having a boiling point in the range of from about 110° Centigrade to about 400° Centigrade and hydrogenated polypiperylenes.

In a third step, polymerization of the cis- and trans-1,3-pentadiene contained in the mixture of saturated and unsaturated hydrocarbon molecules is continued by adding the second portion of the mixture to the first portion of the mixture at a specific rate. The specific rate is that which is sufficient to attain and maintain steady reflux conditions within a polymerization vessel. The specific rate is continued until addition of the second portion is complete. If desired, a chain transfer agent can be added to the first portion concurrently with the second portion.

Also within the scope of the present invention is the polymer of 1,3-pentadiene so prepared.

In still another aspect, the present invention is a method for anionically preparing polymers of 1,3-pentadiene from a mixture of saturated and unsaturated hydrocarbon molecules. At least 50 percent by weight of the molecules contain 5 carbon atoms per molecule. The mixture comprises cis-1,3-pentadiene, trans-1,3-pentadiene, cyclopentadiene and other 5-carbon atom molecules.

The method comprises contacting, in an inert atmosphere, the mixture of saturated and unsaturated hydrocarbon molecules with an amount of an anionic polymerization initiator. The anionic polymerization initiator is selected from the group consisting of alkali metal-polycene complexes and addition compounds of an alkali metal with alpha-methylstyrene.

The amount of initiator is sufficient to (a) inactivate the chain termination function of generally all (1) cyclopentadiene, (2) active hydrogen compounds and (3) other polymerization-terminating compounds contained in the mixture of saturated and unsaturated hydrocarbon molecules and (b) initiate polymerization of 1,3-pentadiene contained in the mixture of saturated and unsaturated hydrocarbon molecules.

Also within the scope of the present invention is the polymer of 1,3-pentadiene so prepared.

In another aspect, the present invention is a synthetic saturated oil prepared by hydrogenating the polymers of 1,3-pentadiene produced by the aforementioned processes.

DESCRIPTION OF THE PREFERRED EMBODIMENTS

A polymerization stock suitable for purposes of this invention is the so-called $C_5$ stream, or distillation cut, available as a byproduct of crude oil refining or cracking operations. The so-called $C_5$ cut is a distillation fraction composed of saturated and unsaturated hydrocarbon molecules and, as used herein, means that, based upon weight of fraction, more than about 50 percent by weight of said molecules contain five carbon atoms. Suitably, more than about 60 weight percent of said molecules contain five carbon atoms. Beneficially, more than about 70 weight percent of said molecules contain five carbon atoms. Desirably, more than about 80 weight percent of said molecules contain five carbon atoms. Preferably, more than about 85 weight percent of said hydrocarbon molecules contain five carbon atoms. Most preferably, more than about 90 weight percent of said hydrocarbon molecules contain five carbon atoms.

Side streams relatively rich in olefins or diolefins are generally available as products of the refining and cracking operations. The amount of diolefins can be increased by suitable cracking of an appropriate cut of a desired boiling range and/or by fractionation of side streams.

A fraction or distillate cut rich in diolefins such as 1,3-pentadiene can be used as a polymerization stock either as received or after removal of impurities or polymerization-terminating compounds, chain transfer agents and other undesirable compounds.

The following is a gas chromatographic analysis, expressed in terms of weight percent (to the nearest 0.01) based on weight of sample, of a typical impure $C_5$ refinery stream obtained by the cracking of naphtha:

| Component | Weight Percent (Rounded To nearest 0.01) |
|---|---|
| propylene | 0.17 |
| propane | 0.16 |
| butenes | 0.18 |
| 1,3-butadiene | 0.81 |
| n-butane | 0.05 |
| vinyl acetylene | 0.02 |
| ethyl acetylene | 0.05 |
| cis-butene-2 | 1.29 |
| 1,2-butadiene | 1.38 |
| 3-methylbutene-1 | 0.88 |
| isopentane | 1.87 |
| 1,4-pentadiene | 5.50 |
| butyne-2 | 1.74 |
| pentene-1 | 14.25 |
| 2-methylbutene-1 | 2.90 |
| n-pentane | 2.35 |
| isoprene | 20.38 |
| trans-pentene-2 | 3.28 |
| cis-pentene-2 | 2.19 |
| 2-methylbutene-2 | 1.64 |
| trans-1,3-pentadiene | 13.77 |
| cyclopentadiene | 5.58 |
| cis-1,3-pentadiene | 6.45 |
| cyclopentene | 8.78 |
| cyclopentane | 0.03 |
| 1,5-hexadiene | <0.01 |
| dicyclopentadiene | 2.19 |
| residue | 2.10 |
| | 100 wt % |

The preceding gas chromatographic analysis indicates the presence of diolefins other than 1,3-pentadiene. These diolefins will also polymerize, at least to some extent, under polymerization conditions suitable for polymerization of 1,3-pentadiene. It may be desirable to remove all or part of the diolefins other than 1,3-pentadiene prior to polymerization.

A gas chromatograph analysis, expressed in terms of weight percent (to the nearest 0.01) based on weight of sample, of a piperylene concentrate or $C_5$ refinery stream which has an increased amount of 1,3-pentadiene, is as follows:

| Component | Weight Percent (Rounded to nearest 0.01) |
|---|---|
| propane | <0.01 |
| isobutane | <0.01 |
| n-butane | <0.01 |
| neopentane | <0.01 |
| isobutene | <0.01 |
| butene-1 | <0.01 |
| trans-butene-2 | <0.01 |
| isopentane | <0.01 |
| cis-butene-2 | <0.01 |
| 3-methylbutene-1 | 0.05 |
| 1,3-butadiene | <0.01 |
| pentene-1 | 0.14 |
| propane | <0.01 |
| isobutane | <0.01 |
| n-butane | <0.01 |
| neopentane | <0.01 |
| isobutene | <0.01 |
| butene-1 | <0.01 |
| 1,2-butadiene | <0.01 |
| cis- and trans-pentene-2 | <0.01 |
| 2-methylbutene-1 | 2.79 |
| 2-methylbutene-2 | 3.58 |
| 1,4-pentadiene | <0.01 |
| butyne-1 | 4.68 |
| $C_6H_{12}$, 4-methylpentene-2, methylpentene and $C_5H_{10}$ cyclopentene | 4.12 |
| | 20.12 |
| butyne-2 and 2-methylpentene-1 | 2.56 |
| 1,5-hexadiene | 3.75 |
| $C_6H_{10}$ | 1.11 |
| cyclopentadiene | 2.56 |
| benzene | 0.48 |
| residue | 2.28 |
| isoprene | 3.65 |
| trans-1,3-pentadiene | 29.01 |
| cis-1,3-pentadiene | 17.77 |
| dicyclopentadiene | 1.16 |
| | ~100 wt % |

The present invention is applicable to mixtures such as the impure $C_5$ refinery stream and the piperylene concentrate as illustrated in the gas chromatograph analyses hereinbefore set forth. In order to be economically viable, the mixture must contain at least five percent by weight of 1,3-pentadiene, based on mixture weight. Mixtures containing from about 25 to about 95 weight percent of 1,3-pentadiene, based on mixture weight, are desirable because they contain more 1,3- pentadiene monomer to be polymerized. Mixtures containing from about 40 to about 60 weight percent of 1,3-pentadiene, based on mixture weight are preferred because of availability as well as 1,3-pentadiene content.

Soday, in U.S. Pat. No. 2,398,973, teaches that impurities, e.g., active hydrogen compounds and polymerization terminating compounds, can be inactivated by treatment with a finely dispersed alkali metal. The alkali metal is selected from the group consisting of metals of Group IA and Group IIA of the periodic system and active alloys of such metals. Piperylene fractions may be purified in the same manner.

The presence or absence of active hydrogen compounds may be determined by the well-known Zerewitinoff method.

For purposes of the present invention, the alkali metal is suitably selected from the group consisting of lithium, sodium, potassium, sodium-potassium alloys, lithium-sodium alloys and lithium-potassium alloys. Finely dispersed metallic sodium is particularly suited for purposes of the present invention.

Treatment of a $C_5$ fraction with finely dispersed metallic sodium results in an effective removal of sodium reactive inhibitors or polymerization terminating compounds such as cyclopentadiene, alpha-alkynes, oxygen compounds, sulfur and sulfur compounds and within a narrow temperature range, allenes. See, Siegmann, U.S. Pat. No. 3,792,105, the teachings of which are incorporated herein by reference thereto.

In accordance with the present invention, an anionic polymerization initiator is selected from the group consisting of (a) alkali metals, (b) dispersions of a finely divided alkali metal in an aliphatic hydrocarbon, (c) organo-alkali metal compounds, (d) addition compounds of an alkali metal with alpha-methylstyrene tetramer and (e) alkali metal-polycene complexes. It has been found that a co-initiator, e.g, an organic polar solvent, must be used in conjunction with all of the listed initiators except for alkali metal-polycene complexes and addition compounds of an alkali metal with alpha-methylstyrene tetramer in order to achieve a practical rate of polymerization.

As hereinafter described, alkali metal-polycene complexes and addition compounds of an alkali metal with alpha-methylstyrene are prepared in an organic polar solvent. An additional amount of organic polar solvent is usually unnecessary.

The alkali metal is suitably selected from the group consisting of lithium, potassium, sodium, sodium-potassium alloys, lithium-sodium alloys and lithium-potassium alloys.

As is apparent from the preceding paragraphs, the anionic polymerization initiator may be the same as, or different from, the alkali metal selected to inactivate cyclopentadiene, active hydrogen compounds and polymerization terminating compounds. For simplicity, the anionic polymerization initiator and the alkali metal are the same. If they are not the same, an additional step, whereby the inactivated compounds and any residual alkali metal are removed before beginning polymerization of 1,3-pentadiene, may be necessary.

The organo-alkali metal compound is suitably selected from the group consisting of organo-lithium compounds, organo-sodium compounds and organo-potassium compounds. The organo-portion of the organo-alkali metal compound is suitably selected from the group consisting of alkyl radicals having from one to ten carbon atoms per alkyl group, alkylaryl radicals having only one alkyl substituent and from seven to twelve carbon atoms per alkylaryl group, and aryl radicals selected from the group consisting of phenyl, biphenyl, naphthyl and fluorenyl radicals. The organo-portion is beneficially an alkyl radical having from one to six carbon atoms per radical.

The organo-alkali metal compound is desirably an organo-lithium compound selected from the group consisting of isopropyllithium, n-butyllithium, t-butyllithium, sec-butyllithium, t-octyllithium, n-decyllithium, phenyllithium, naphthyllithium, 4-butylphenyllithium, p-tolyllithium, 4-phenylbutyllithium, cyclohexyllithium, 4-butyl-cyclohexyllithium, 4-cyclohexyl-butyllithium, and the like. The organo-alkali metal compound is preferably n-butyllithium.

Suitable alkali metal-polycene complexes are described in U.S. Pat. Nos. 3,410,836; 3,448,020; 3,458,491; 3,530,105; 3,534,012; 3,684,741; 3,734,970; and 3,751,403, the teachings of which are herewith incorporated by reference thereto.

The polycene or polynuclear aromatic compound is suitably selected from the group consisting of naphthalene, anthracene, phenanthrene, biphenyl, chrysene, or p-terphenyl. The alkali metal is suitably selected from the group of alkali metals listed hereinabove.

The alkali metal-polycene complex is beneficially a potassium-naphthalene complex. Preparation of potassium-naphthalene complexes is well known. Illustrative processes are described in U.S. Pat. Nos. 2,019,832; 2,023,793; 2,027,000; and 2,985,594, the teachings of which are incorporated herein by reference thereto.

The potassium-naphthalene complex is generally an equimolar mixture of potassium and naphthalene, the naphthalene being in admixture with an organic polar solvent. The potassium-naphthalene complex must be prepared in an organic polar solvent since the complex is not soluble in non-polar systems. The organic polar solvent is thought to serve two functions. First, the solvent serves as a solubilizing agent for the complex. Second, the solvent serves as an initiation promoter (co-initiator) for polymerizing 1,3-pentadiene.

The organic polar solvent used in preparing an alkali metal-polycene complex is suitably selected from the group consisting of ethers such as tetrahydrofuran, dimethyl tetrahydrofuran, ethyl methyl ether, ethylene glycol dimethyl ether, diethylene glycol dimethyl ether, triethylene glycol dimethyl ether, tetraethylene glycol dimethyl ether, and anisole; dioxane and hexamethyl phosphoramide. The organic polar solvent is desirably selected from the group consisting of tetrahydrofuran and ethylene glycol dimethyl ether.

Suitable addition compounds of an alkali-metal with alpha-methylstyrene tetramer are described in U.S. Pat. No. 3,530,105, the teachings of which are incorporated herein by reference thereto. The method of preparing such addition compounds is also disclosed therein. The alkali-metal is suitably selected from the group of alkali metals indentified hereinabove. The alkali metal is beneficially sodium.

Finely divided dispersions of an alkali metal in an aliphatic hydrocarbon are desirably used in conjunction with an organic polar solvent and a chain transfer agent. The alkali metal dispersion is suitably present in an amount such that an alkali metal content of from about 0.1 to about 25 mole percent, beneficially from about 3 to about 20 mole percent, based on amount of 1,3-pentadiene monomer, is available to function as a polymerization initiator. Desirably, the amount of available alkali metal is from about 7.5 to about 10.5 mole percent, based on amount of 1,3-pentadiene monomer.

The aliphatic hydrocarbon is beneficially selected from the group consisting of non-reactive medium and high boiling hydrocarbons up to and including petrolatum. The aliphatic hydrocarbon is desirably selected from the group consisting of mineral oils having boiling points within the range of from about 110° to about 400° Centigrade and hydrogenated polypiperylene. By non-reactive, persons skilled in the art will recognize that the aliphatic hydrocarbon must not interfere with the polymerization of 1,3-pentadiene. The alkali metal which is dispersed in an aliphatic hydrocarbon is suitably selected from the group of alkali metals listed hereinabove. Beneficially, the alkali metal is sodium.

The organic polar solvent used in conjunction with a dispersion of an alkali metal in an aliphatic hydrocarbon is beneficially selected from the group of organic polar solvents hereinbefore identified as being useful in preparing alkali metal-polycene complexes.

The chain transfer agent used in conjunction with an alkali metal dispersion is suitably selected from the group consisting of toluene, cumene, xylene, 1,2,3-trimethylbenzene, 1,2,4-trimethylbenzene, 1,3,5-trimethylbenzene, 1,2,3,5-tetramethylbenzene, diisopropylbenzene, diphenyl methane, triphenyl methane and the like. Beneficially, the chain transfer agent is toluene.

The use of chain transfer agents in anionic polymerization processes to produce polymers having lower molecular weights than polymers similarly prepared without the use of a chain transfer agent is known. See, A. L. Gatzke, "Chain Transfer in Anionic Polymerization: Determination of Chain-Transfer Constants by Using Carbon-14-Labeled Chain Transfer Agents", *Journal of Polymer Science,* Part A-1, Vol. 7. pp. 2281-92 (1969).

When using an alkali metal dispersion as the polymerization initiator and an organic polar solvent as the co-initiator, the chain transfer agent is suitably present in an amount of from about 10 to about 150 mole percent based on amount of 1,3-pentadiene. The amount of chain transfer agent is beneficially from about 70 to about 90 mole percent based on amount of 1,3-pentadiene.

It is believed that the organic polar solvent which is used in conjunction with an alkali metal dispersion serves at least two functions. In addition to functioning as a co-initiator, it is believed that the organic polar solvent solvates, or prevents agglomeration of, the alkali metal initiator. The organic polar solvent is suitably present in an amount of from about 1 to about 800 mole percent based on amount of 1,3-pentadiene. The amount is beneficially from about 50 to about 400 mole percent based on amount of 1,3-pentadiene. It has been found that small amounts of an organic polar solvent result in a rate of polymerization which is slower than that attainable with larger amounts of an organic polar solvent.

The anionic polymerization initiator is used in an amount which may vary over a wide range. Generally the amount will be from about 0.01 to about 25.0 mole percent based on the amount of piperylene. Beneficially, the amount of initiator is from about 0.1 to about 20.0 mole percent based upon the amount of piperylene. Desirably, the amount of initiator is from about 2.0 to about 20.0 mole percent based upon the amount of piperylene.

An upper limit upon the amount of initiator depends upon factors such as molecular weight desired, and cost of the initiator. Conversely, a lower limit upon the level of initiator depends upon factors such as molecular weight desired and the polymerization rate desired. At very low initiator levels, reaction times may become excessively long and may result in poor yields because of chain termination reactions.

It is generally recognized that initiator amounts are inversely related to polymer molecular weight. That is, a large amount of initiator results in a low molecular weight polymer and vice versa.

It has surprisingly been found that molecular weight of polymers of 1,3-pentadiene prepared with an alkali metal-polycene complex initiator is not affected by the amount of initiator. That is, the polymers have relatively low weight average molecular weights which fall within a relatively narrow weight average molecular weight range irrespective of the amount of initiator present during polymerization of 1,3-pentadiene.

The polymers prepared with an alkali metal-polycene suitably have a weight average molecular weight of from about 900 to about 1500 grams per mole, beneficially, from about 1100 to about 1400 grams per mole. Persons skilled in the art will recognize that viscosity of the polymer similarly falls within a relatively narrow range.

The co-initiator used with initiators other than alkali metal-polycene complexes and addition compounds of an alkali metal with alpha-methylstyrene is suitably an organic polar compound or solvent. Examples of suitable organic polar compounds are ethers such as dimethyl ether, diethyl ether, tetrahydrofuran, dimethyltetrahydrofuran, ethyl methyl ether, ethylene glycol dimethyl ether, diethylene glycol dimethyl ether, anisole; amines such as tetramethylethylenediamine; and hexamethyl phosphoramide. The organic polar compound is beneficially selected from the group consisting of tetrahydrofuran, ethylene glycol dimethyl ether, tetramethylethylenediamine, diethylene glycol dimethyl ether, and hexamethylphosphoramide. The organic polar compound is preferably selected from the group consisting of tetrahydrofuran and ethylene glycol dimethyl ether.

The organic polar compound is used in an amount which may vary over a wide range. The amount will generally be from about 0.2 to about 145 mole percent based upon the amount of 1,3-pentadiene. The amount of organic polar solvent is beneficially from about 1.4 to about 44 mole percent based upon the amount of 1,3-pentadiene.

Co-initiator levels of less than about 0.2 mole percent will not result in an economically feasible rate of polymerization. Co-initiator levels of greater than about 145 mole percent will result in a satisfactory rate of polymerization but will generally be uneconomical. The co-initiator serves in an added capacity as a diluent. This is beneficial because the anionic polymerization reaction of the present invention is exothermic.

Mixtures of saturated and unsaturated hydrocarbon molecules suitable for use with the present invention usually contain, as noted hereinabove, amounts of cyclopentadiene, active hydrogen compounds and other polymerization terminating compounds. These compounds are suitably inactivated and removed from such mixtures prior to polymerization of cis- and trans-1,3-pentadiene contained therein.

If desired, the steps of inactivating and removing the aforementioned polymerization-terminating compounds may be omitted if a sufficient amount of anionic polymerization initiator is to be used. The sufficient amount is determined in part by content of polymerization terminating compounds and in part by requirements for polymerization.

By omitting the inactivation and removal steps, the cyclopentadiene contained in a typical impure $C_5$ refinery stream is not inactivated.

Siegmann, in U.S. Pat. No. 3,792,105, teaches that cyclopentadiene hinders polymerization of isoprene from an isoprene-containing $C_5$ hydrocarbon fraction. Cyclopentadiene also hinders polymerization of 1,3-pentadiene. Small amounts of cyclopentadiene are, however, tolerable when a low molecular weight, low viscosity polymer is desired. Excessive amounts of cyclopentadiene generally result in an undesirably broad molecular weight distribution.

Satisfactory results are obtained if the mixture of saturated and unsaturated hydrocarbons contains cyclopentadiene in an amount of from about 0 to about 10 mole percent based on 1,3-pentadiene. The amount of cyclopentadiene contained in the mixture is beneficially from about 0 to about 3 mole percent based on 1,3-pentadiene.

The inert atmosphere suitably comprises a gaseous element or compound which is chemically unreactive, within detectable limits, with (a) components of the polymerization feedstream, (b) polymerization products derived therefrom or (c) the polymerization initiator. The gaseous element is beneficially selected from the group consisting of helium, neon, argon and nitrogen. Nitrogen, because of cost considerations and availability, is the gaseous element of choice when using one of the hereinabove identified polymerization initiators other than metallic lithium. Those skilled in the art will recognize that lithium metal reacts with gaseous nitrogen to from nitrides.

Polymerization time may vary from less than about one hour to more than about 100 hours. Actual polymerization time depends upon a number of parameters, e.g., levels of initiator and co-initiator, temperature and pressure. Polymerization time is beneficially from about 0.05 to about 3.00 hours, desirably from about 0.35 to about 0.45 hours.

Pressure within a polymerization vessel is not particularly critical. Pressures of from about 0 to about 5000 pounds per square inch gauge may be used. Pressures of less than about 1000 pounds per square inch are suitable. Pressure is beneficially from about 0 to about 300 pounds per square inch gauge, desirably from about 0 to about 100 pounds pounds per square inch gauge.

Temperature limits are similarly not particularly critical. A reaction mixture or polymerization feedstream may have a temperature which is in the range of from about $-78°$ Centigrade to about 150° Centigrade. A suitable temperature range is from about 0° Centigrade to about 100° Centigrade. A beneficial temperature range is from about 40° Centigrade to about 80° Centigrade.

When using an alkali metal-polycene complex as the initiator, a suitable temperature range is from about 0° Centigrade to about 60° Centigrade.

Persons skilled in the art will recognize that temperatures affects polymerization rates. Excessively low temperatures generally lead to correspondingly low polymerization rates. Such low temperatures may also yield a polymer of 1,3-pentadiene which has an undesirably broad molecular weight distribution. Excessively high temperatures, on the other hand, may lead to an uncontrolled polymerization reaction.

When polymerization of piperylene monomer is generally complete, the polymerization initiator is inactivated by adding an external chain terminating agent. The polymer is then separated, washed and dried using conventional recovery techniques.

External chain terminating agents which can be added to the anionic polymerization system of this invention are known. Several external chain terminating agents are listed in U.S. Pat. No. 3,070,579 to Szwarc, the teachings of which are incorporated herein by reference thereto. Among those which are highly useful are:
(1) carbon dioxide, which, when followed by acidification, produces the carboxyl group (—COOH);
(2) carbon bisulfide, which, when followed by acidification, produces the carbodithiol group (—CSSH);
(3) ethylene oxide which, when followed by acidification, produces the hydroxyethyl group (—CH$_3$—CH$_3$OH); and
(4) proton donors such as water, alcohols, or acids which donate a hydrogen atom.

The selection of particular chain terminating agent is not a part of this invention. As such, this invention is not limited to a particular external terminating agent.

Illustrative external terminating agents are water, methyl alcohol, carbon dioxide, lower alkylene oxides, e.g., ethylene oxide, propylene oxide and butylene oxide, ethylene sulfide, propylene sulfide, butylene sulfide, carbon disulfide, epichlorohydrin, lower alkyl aldehydes, e.g., formaldehyde, acetaldehyde, propionaldehyde, and butylaldehyde; and lower alkyl ketones, e.g., acetone, methyl ethyl ketone, diethyl ketone, and dibutyl ketone. As used herein the terms "lower alkyl" and "lower alkylene" mean those alkyl and alkylene groups having 1-4 carbon atoms.

It is generally desirable to neutralize externally terminated polymers prior to polymer recovery. It is known that: (a) an externally terminated polymer is a conjugate base of an acid, and (b) a conjugate base may be neutralized by any acid which is more acidic than the conjugate acid of the conjugate base. Suitable neutralizing acids are known to those skilled in polymer chemistry.

Selection of a particular neutralizing acid is not a part of this invention. Accordingly, this invention is not limited to a particular neutralizing acid. Illustrative neutralizing acids are anhydrous hydrochloric acid, acetic acid, phosphoric acid, pyrophosphoric acid and toluene sulfonic acid. Some neutralizing acids are more effective than others.

Polymers of piperylene prepared in accordance with the present invention are composed of the three constitutional repeating units (CRU) set forth below:

$$CH_2=CH-CH=CH-CH_3 \longrightarrow \quad \text{1-2 CRU}$$

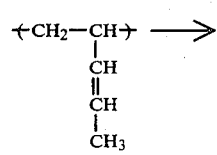

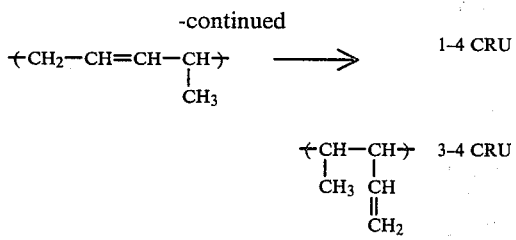

After hydrogenation, the 1–2 CRU yields a pendent propyl group, the 1–4 CRU a pendent methyl group and the 3–4 CRU a pendent methyl group and a pendent ethyl group.

When a monofunctional organo-alkali metal initiator is used, the organo portion of the initiator is attached to one end of a molecule of polypiperylene. The molecule of polypiperylene also has a second end. After termination with an external terminating agent, the second end will have an external terminating agent functionality attached thereto.

Similarly, when a difunctional anionic initiator such as an addition compound of an alkali metal with alpha-methylstyrene tetramer is used the alpha-methylstyrene tetramer is polymerized within a molecule of polypiperylene.

When a chain transfer agent is used, at least some of the polymer molecules will have one end terminated by the chain transfer agent.

When an alkali metal-polycene complex is used, the polycene portion is not incorporated into the polymer structure.

The polymers of piperylene prepared in accordance with the present invention are believed to be linear and generally devoid of any crosslinking or cyclization.

The polymers of piperylene so prepared have certain characteristic ratios of constitutional repeating units depending upon the initiator selected.

When an initiator which contains an alkali metal other than sodium is used, the ratio of constitutional repeating units, as determined by carbon-13 Nuclear Magnetic Resonance analysis and based on total amount of constitutional repeating units is:
 1–2 CRU—from about 40 to about 56 percent
 3–4 CRU—from about 6 to about 14 percent
 1–4 CRU—from about 37 to about 47 percent
The ratio of constitutional repeating units is beneficially:
 1–2 CRU—from about 44 to about 52 percent
 3–4 CRU—from about 7 to about 13 percent
 1–4 CRU—from about 38 to about 46 percent
The ratio of constitutional repeating units is desirably:
 1–2 CRU—from about 46 to about 49 percent
 3–4 CRU—from about 8 to about 12 percent
 1–4 CRU—from about 40 to about 44 percent When using an alkali metal-containing anionic polymerization initiator wherein sodium is the alkali metal, the ratio of constitutional repeating units, as determined by carbon-13 nuclear magnetic resonance analysis and based on total content of constitutional repeating units is:
 1–2 CRU—from about 55 to about 63 percent
 3–4 CRU—from about 10 to about 16 percent
 1–4 CRU—from about 23 to about 31 percent
The ratio of constitutional repeating units is beneficially:
 1–2 CRU—from about 57 to about 61 percent
 3–4 CRU—from about 11 to about 15 percent
 1–4 CRU—from about 24 to about 30 percent
The ratio of constitutional repeating units is desirably:
 1–2 CRU—from about 58 to about 60 percent
 3–4 CRU—from about 12 to about 14 percent
 1–4 CRU—from about 26 to about 28 percent It is believed that as the 1–2 constitutional repeating unit content of piperylene polymers increases, kinematic viscosity of the polymers decreases. One method of determining kinematic viscosity involves use of Cannon Ubbelohde viscometer.

Polypiperylene may be functionalized or further treated in accordance with a number of known processes to produce useful products. Illustrative further treatments include hydrogenation, phenolation, epoxidation, halogenation, sulfonation, addition of maleic anhydride, block polymerization and the like.

When an addition compound of an alkali metal with alpha-methylstyrene is used as the initiator, tri-block (ABA) or penta-block (CABAC) polymers can be made. If penta-block polymers are to be made, an additional monomer such as styrene must be post-added to the tri-block polymer before polymerization is terminated. Skilled artisans will recognize that in making penta-block polymers, a mixture of penta-block, tetra-block and tri-block polymers is actually prepared.

The polymers of 1,3-pentadiene or piperylene prepared in accordance with the present invention may be hydrogenated using conventional technology. Illustrative procedures are discussed by C. W. Moberly in *The Encyclopedia of Polymer Science Technology* (1967) at pages 557–68. Also of interest are the hydrogenation procedures disclosed in U.S. Pat. Nos. 4,101,599 and 4,122,023.

Hydrogenation of liquid polypiperylene is suitably carried out by treatment with hydrogen in the presence of a hydrogenation catalyst.

Hydrogenation is usually carried out at a temperature of from about 0° Centigrade to about 250° Centigrade. The temperature is beneficially from about 30° Centigrade to about 150° Centigrade.

A typical time interval for hydrogenation is from about 1 to about 100 hours.

A typical hydrogen pressure is from about 10 to about 2000 pounds per square inch gauge. The pressure is beneficially from about 300 to about 800 pounds per square inch gauge, desirably from about 50 to about 150 pounds per square inch gauge.

Hydrogenation may be carried out in the presence or absence of an inert solvent such as a ketone, e.g., methyl ethyl ketone; an aliphatic hydrocarbon, e.g., heptane, hexane, pentane or cyclohexane or mixtures thereof; or, an aromatic hydrocarbon, e.g., toluene. Hydrogenation is benefically carried out in the presence of an inert aliphatic hydrocarbon solvent.

Any conventional hydrogenation catalyst may be used in accordance with the present invention. Hydrogenation catalysts generally fall into the categories (a) metal and supported metal catalysts, (b) noble metal and supported noble metal catalysts and (c) organometal-metal salt combinations, also referred to as homogeneous or soluble catalysts.

Illustrative metal and supported metal catalysts include unsupported nickel, Raney nickel, Rufert nickel, nickel-kieselguhr, nickel-alumina and nickel on diatomaceous earth.

Illustrative noble metal and supported noble metal catalysts include palladium, platinum, rhodium, ruhenium, and palladium on carbon.

Illustrative organometal-metal salt combinations include triisobutylaluminum in combination with acetylacetonates of cobalt, chromium, or tetraisopropyl titanate; amine boranes, and chromium or tin tetraalkylboron compounds.

A suitable hydrogenation catalyst is palladium on a carbon support.

In a batch hydrogenation, the hydrogenation catalyst is suitably employed in a concentration of from about 0.1 to about 50 weight percent based on weight of polypiperylene. The hydrogenation catalyst is beneficially employed in a concentration of about 5 weight percent based on weight of polypiperylene. Operating outside the aforementioned limits is believed to be economically impractical. A continuous hydrogenation may also be practiced.

After completion of the hydrogenation, the hydrogenation catalyst and the solvent are removed from the reaction mixture by conventional methods. A suitable method includes filtration followed by flash distillation.

A hydrogenated liquid polymer, or synthetic saturated oil, suitably has a weight average molecular weight of from about 200 to about 40,000 grams per mole and a number average molecular weight of from about 136 to about 17,000 grams per mole. The saturated oil having such a molecular weight also has a viscosity at 100° Fehrenheit of from about 10 to about 100,000 centistrokes and a viscosity at 210° Fahrenheit of from about 3 to about 1,000 centistokes. The saturated oil has a viscosity index as determined by the American Society for Testing and Materials (ASTM) Data Series 39a of from about 110 to about 150. The saturated oil further has a pour point of from about −18° to about −60° Fehrenheit, a flash point and a fire point as determined by the Cleveland Open Cup Method of ASTM D 92-72 respectively of about 420° Fehrenheit and 510° Fehrenheit. The aforementioned saturated oil also has a physical appearance which ranges from colorless to light yellow.

As the molecular weight of the hydrogenated liquid polymer varies, other characteristic properties such as pour point, viscosity, flash point and fire point will also vary.

Hydrogenated liquid polymers having weight average molecular weights in excess of 40,000 grams per mole may also be prepared.

The hydrogenated polymers of 1,3-pentadiene produced in accordance with the present invention have a large number of potential uses. Illustrative uses include (a) lubricant basestocks; (b) fully formulated synthetic lubricants; and (c) as a component in a blend with esters, oils, synthetic hydrocarbons, phosphate esters and polyoxyalkylene glycols.

Hydrogenated polypiperylenes may be used alone or in conjunction with other fluids such as polyalkylene glycols, poly-α-olefins, pentaerythritol esters, dicarboxylic acid esters, esters derived from alcohols with 1–8 hydroxyl groups, phosphate esters, polyphenyls, hydrogenated polydienes, silicones and mineral oils.

Lubricant formulations may also contain inhibitors and other additives which do not detract from properties desired of the blend.

Potential end use applications include use as lubricants for compression and spark ignition engines, two cycle engines, rotary engines, gas engines, gas turbine engines, and aircraft and industrial equipment such as pumps and compressors. The hydrogenated polymers may also be used as hydraulic fluids, heat transfer fluids and transformer fluids.

The following examples illustrate the manner in which the principles of the present invention are applied. The examples are not to be construed as limiting the scope of the invention. All parts and percentages are by weight and all temperatures are in degrees Centigrade unless otherwise specified.

Treatment of Piperylene Cut

A one-liter glass bottle was filled with a piperylene cut, or concentrate. The concentrate contained about 50 percent of 1,3-pentadiene, based on total concentrate weight.

A length of metallic sodium ribbon was immersed in the concentrate in order to cause sodium reactive impurities, specifically cyclopentadiene, water and 1-butyne, to react and precipitate out of solution.

The presence, or absence, of 1-butyne and cyclopentadiene is detected by gas chromatography.

The bottle was loosely capped to allow hydrogen gas to escape. The bottle was allowed to stand at room temperature with occasional stirring until vapor phase chromatograph peaks representing 1-butyne and cyclopentadiene, as measured using a gas chromatograph, had disappeared. A Hewlett-Packard 5880 Capillary Gas Chromatograph, commercially available from Hewlett-Packard Company was used for determination of composition.

The contents of the bottle were then filtered and flash distilled under a nitrogen blanket to remove solid impurities and any color associated therewith. A clear, treated piperylene concentrate remained after filtration and flash distillation.

EXAMPLE 1

Polymerization with n-butyllithium Polymerization Apparatus

A polymerization apparatus comprising: (a) a 250 milliliter round bottom, three-necked flask having a thermowell; (b) a dry ice condenser having a gas inlet; (c) a mechanical stirrer; and (d) an adapter for a rubber septum, was washed, dried in an oven at a temperature of 125° Centigrade and assembled warm.

A thermometer was placed into the thermowell. The mechanical stirrer was connected to one of the three necks of the flask. The adapter was inserted into a second of the three necks of the flask. The dry ice condenser was fitted into a third of the three necks of the flask. The gas inlet was connected to a gaseous nitrogen source.

A valve and a pressure relief bubbler were interposed between the gas inlet and the nitrogen source with the valve being between the gas inlet and the bubbler. The bubbler had incorporated therein a T-connection and a vent to the atmosphere. The bubbler was partially filled with mineral oil to a level below the vent.

The T-connection consisted of a hollow vertical stem having one end immersed in the mineral oil and a second end remote from the first end. The second end of the T-connection was connected to a hollow horizontal tube at a point midway between a first end and a second end of the tube. The first end of the horizontal tube was connected to the gaseous nitrogen source. The second end of the horizontal tube was connected to the condenser.

When the valve was closed, gaseous nitrogen flowed straight through the horizontal tube from the source to the condenser. When the valve was open, gaseous nitrogen was conducted through the mineral oil via the vertical stem and thereafter to the atmosphere via the vent.

After assembly, the apparatus was evacuated, purged with nitrogen, and then evacuated and purged with nitrogen a second time in order to ensure that generally all oxygen had been removed.

In evacuating the apparatus, the valve was closed, the nitrogen source was turned off and a vacuum line was connected to the adapter for a rubber septum before applying a vacuum to the apparatus.

In purging the apparatus with nitrogen, the valve remained closed, the nitrogen source was turned on and the vacuum line thereafter closed with a clamp.

A continuous flow of nitrogen was established after evacuation and purging by leaving the nitrogen source on, then rapidly replacing the vacuum line connected to the adapter with a rubber septum after which the valve was opened. The condenser was then filled with dry ice.

About 143 milliliters of the treated piperylene concentrate were removed from the glass bottle and charged into the round bottom three-necked flask through the rubber septum using a hypodermic syringe. The concentrate had a temperature of about 25° Centigrade. The concentrate contained about 50 grams or about 0.735 moles 1,3-pentadiene.

About 0.5 milliliters dried tetrahydrofuran were added to the concentrate through the rubber septum using a hypodermic syringe. The mechanical stirrer was then activated.

A solution of 2.6 Normal n-butyllithium in hexane was added dropwise to the concentrate until a yellow color was observed. The yellow color was observed after 2.5 milliliters of the n-butyllithium solution had been added.

After the yellow color was observed, about 5.0 milliliters of n-butyllithium was added rapidly to the concentrate. An n-butyllithium content of 7.5 milliliters was equivalent to about 2.5 mole percent based upon the amount of 1,3-pentadiene.

A temperature rise in the reaction mixture from about 25° Centigrade to about 48° Centigrade followed the second addition of the n-butyllithium solution.

After about 1.5 hours, the temperature of the reaction mixture had fallen to about 25° Centigrade. About 1.2 milliliters of glacial acetic acid were then added to the reaction mixture to terminate the polymerization reaction. The yellow color faded with addition of the acetic acid.

After termination, the reaction mixture was centrifuged to remove a yellow precipitate. The yellow precipitate was lithium acetate.

Following removal of the yellow precipitate, the resulting solution was devolatilized at a temperature of about 95° Centigrade and at a reduced pressure of about 10 millimeter mercury using an evaporator. The evaporator is commercially available under the trade designation Rotavapor ® from Büchi.

Following devolatilization, a clear, viscous liquid resulted which contained about 44.0 grams of polymer. This amounted to an 88 percent yield based upon the amount of 1,3-pentadiene contained in the piperylene concentrate.

The degree of polymer unsaturation was determined by nuclear magnetic resonance spectroscopy using a proton nuclear magnetic resonance instrument commercially available under the trade designation Varian T-60 Proton NMR from Varian Associates. The degree of unsaturation so determined was equivalent to a Bromine number of about 249.

EXAMPLES 2-15 AND COMPARATIVE EXAMPLE 1

Polymerization of Piperylene with Organo-Alkali Metal Initiator

In this series of experiments, polymerization reaction mixtures were prepared in generally the same manner as Example 1. However, ingredient amounts and reaction parameters were varied. The various parameters and the results, if any, obtained therewith are listed in Table II which follows Table I. Table I contains abbreviations which are used in Table II:

TABLE I

Abbreviations

VC = volume of piperylene concentrate (feedstream)
% Pip = percent of 1,3-pentadiene in the feedstream based on weight of the feedstream
wt. Pip = weight of 1,3-pentadiene in the feedstream in grams
Moles Pip = number of moles of 1,3-pentadiene in the feedstream
Type Init. = type of initiator:
n-BuLi = n-butyllithium
Mole Init. = moles of initiator
Type Co-In = type of co-initiator:
THF = Tetrahydrofuran
TMEDA = N,N,N',N'-tetramethylethylenediamine
Glyme = ethylene glycol dimethylether
Rxn Ti = elapsed time from beginning of polymerization to termination of polymerization
Beg. T = temperature of the reaction mixture before polymerization of the reaction mixture (°Centigrade)
Peak T = maximum temperature of the reaction mixture during polymerization (°Centigrade)
ΔT = change in temperature from Beg T to Peak T
$M_w$(Theory) (grams per mole) was determined as follows:
Mw(Theory) = degree of polymerization (D.P.) × molecular weight of a monomer unit in a polymer chain where
D.P. = Moles of monomer ÷ moles of initiator
$M_w$ (weight average molecular weight in grams per mole) and $M_n$ (number average molecular weight in grams per mole) were determined by using gel permeation chromatography.

The ratio of $M_w$ to $M_n$ ($M_w/M_n$) is a measure of the broadness of distribution of molecular weight.

Percent Piperylene Conversion (% Pip.Conv.) was determined using a gas chromatography technique wherein a sample of the feedstream before polymerization is compared with a sample of the reaction mixture following polymerization and polymer recovery using an internal standard method.

Polymer Recovered % (% Poly. Rec.) = weight of recovered polymer ÷ weight of the monomer in the feedstream.

TABLE IIA

| Example | V.C. | % Pip | Wt. Pip | Moles Pip | Type Init | Moles Init | Type Co—In |
|---|---|---|---|---|---|---|---|
| 2 | 115 | 50 | 40.0 | 0.59 | n-BuLi | 0.016 | THF |
| 3* | 143 | 50 | 50.0 | 0.74 | n-BuLi | 0.020 | THF |
| 4 | 143 | 50 | 50.0 | 0.74 | n-BuLi | 0.020 | THF |
| 5 | 143 | 50 | 50.0 | 0.74 | n-BuLi | 0.039 | THF |

TABLE IIA-continued

| Example | V.C. | % Pip | Wt. Pip | Moles Pip | Type Init | Moles Init | Type Co—In |
|---|---|---|---|---|---|---|---|
| 6 | 143 | 50 | 50.0 | 0.74 | n-BuLi | 0.010 | THF |
| 7 | 340 | 50 | 119.0 | 1.75 | n-BuLi | 0.046 | THF |
| 8* | 143 | 50 | 50.0 | 0.74 | n-BuLi | 0.0052 | THF |
|  | 72 | 50 | 25.0 | 0.37 | n-BuLi | 0.0007 |  |
| 9 | 1,300 | 50 | 455.0 | 6.69 | n-BuLi | 0.138 | THF |
| 10 | 1,250 | 50 | 437.2 | 6.43 | n-BuLi | 0.161 | THF |
| 11 | 143 | 50 | 50.0 | 0.74 | n-BuLi | 0.020 | TMEDA |
| 12 | 143 | 50 | 50.0 | 0.74 | n-BuLi | 0.020 | TMEDA |
| 13* | 540 | 50 | 188.7 | 2.78 | n-BuLi | 0.0063 | TMEDA |
| 14 | 143 | 50 | 50.0 | 0.74 | n-BuLi | 0.020 | Glyme |
| 15* | 50 | 100 | 35.0 | 0.52 | n-BuLi | 0.00062 | Glyme |
| Comparative Example 1*** | 150 | 50 | 52.0 | 0.76 | n-BuLi | 0.012 | — |

*The reaction mixtures were heated to about 50° C. and maintained at about that temperature throughout the polymerization reaction.
**Variations of % polymer yield from 100% are thought to be caused by losses due to mechanical handling such as in filtration.
***The reaction mixture was heated from the beginning temperature to the ending temperature in an attempt to initiate polymerization.
+Data not available.

TABLE IIB

| Example | Moles Co—In | Rxn Ti | Beg T | Peak T | ΔT | % Pip Conv | % Poly Recov** |
|---|---|---|---|---|---|---|---|
| 2 | 0.99 | 3.0 | 25 | 50 | 35 | 100 | 93 |
| 3* | 0.012 | 24.0 | 50 | 50 | 0 | >95 | 86 |
| 4 | 0.062 | 1.5 | 25 | 50 | 25 | >95 | 88 |
| 5 | 0.062 | 1.5 | 25 | 50 | 25 | 100 | 96 |
| 6 | 0.062 | 3–24 | 25 | 50 | 25 | >95 | 89 |
| 7 | 0.143 | 1.5 | 25 | 50 | 25 | >95 | 88 |
| 8* | 0.031 | 24.0 | 50 | 50 | 0 | 75 | 60 |
| 9 | 0.430 | 1.0 | 0 | 50 | 50 | 100 | 93 |
| 10 | 0.370 | 3.0 | 10 | 50 | 40 | 100 | 96 |
| 11 | 0.020 | 1.0 | 25 | 50 | 25 | 100 | 99 |
| 12 | 0.0033 | 8.0 | 25 | 40 | 15 | 100 | 99 |
| 13* | 0.0059 | 24.0 | 50 | 50 | 0 | 90 | 89 |
| 14 | 0.050 | 0.25 | 25 | 50 | 25 | 100 | 91 |
| 15* | 0.005 | 60–72 | 50 | 50 | 0 | 90 | 90 |
| Comparative Example 1*** | — | 4.0 | 25 | 55 | 30 | 0 | 0 |

*The reaction mixtures were heated to about 50° C. and maintained at about that temperature throughout the polymerization reaction.
**Variations of % polymer yield from 100% are thought to be caused by losses due to mechanical handling such as in filtration.
***The reaction mixture was heated from the beginning temperature to the ending temperature in an attempt to initiate polymerization.
+Data not available.

TABLE IIC

| Example | $M_w$ Theory | $M_w$ | $M_n$ | $M_w/M_n$ | General Comments |
|---|---|---|---|---|---|
| 2 | 2,500 | 6,651 | 4,285 | 1.55 |  |
| 3* | 2,500 | 6,514 | 5,233 | 1.25 |  |
| 4 | 2,500 | 4,132 | 3,741 | 1.105 |  |
| 5 | 1,292 | 2,216 | 1,570 | 1.41 |  |
| 6 | 5,000 | 4,646 | 2,373 | 1.96 |  |
| 7 | 2,500 | 2,917 | 1,884 | 1.55 |  |
| 8 | 12,711 | 10,171 | 4,084 | 2.49 | additional concentrate and n-BuLi added after initial addition of concentrate had polymerized |
| 9 | 3,297 | + | + | + |  |
| 10 | 2,716 | 4,667 | 3,480 | 1.34 |  |
| 11 | 2,500 | 4,419 | 3,641 | 1.22 |  |
| 12 | 2,500 | 4,141 | 3,146 | 1.32 |  |
| 13* | 19,952 | 10,483 | 4,429 | 2.37 |  |
| 14 | 2,500 | + | + | + |  |
| 15 | 56,452 | 36,932 | 16,425 | 2.25 | Reaction carried out in a sealed bottle |
| Comparative Example 1*** | 4,333 | No Reaction |  |  | 0.471 mole toluene solvent used |

*The reaction mixtures were heated to about 50° C. and maintained at about that temperature throughout the polymerization reaction.
**Variations of % polymer yield from 100% are thought to be caused by losses due to mechanical handling such as in filtration.
***The reaction mixture was heated from the beginning temperature to the ending temperature in an attempt to initiate polymerization.
+Data not available.

It is important to note that, in the case of Comparative Example 1, no perceptible polymerization of piperylene was observed when a non-polar organic solvent was used as a co-initiator even with the application of heat.

Examples 2–14 illustrate that molecular weight varies according to the amount of n-butyllithium initiator added to the reaction mixture.

Example 8 represents an unsuccessful attempt to obtain a narrow molecular weight distribution of a high molecular weight polymer, the lack of success being measured in terms of $M_w/M_n$.

Similar results are obtained with other organo-alkali metal initiators in conjunction with various organic polar solvent co-initiators. Suitable organo-alkali metal initiators and organic polar solvent co-initiators are set forth hereinabove.

EXAMPLE 16

Polymerization of Piperylene Using a Potassium-Naphthalene Complex Initiator

Preparation of a Potassium Naphthalene Initiator Complex

An initiator complex preparation apparatus identical to the polymerization apparatus hereinbefore described was prepared and assembled in the same manner as the polymerization apparatus.

About 6.0 grams of potassium pieces were placed in the flask prior to insertion of the adapter into the second neck. The apparatus was evacuated, purged with nitrogen and then evacuated and purged with nitrogen a second time in the same manner as the polymerization apparatus in Example 1 in order to ensure that generally all oxygen had been removed. A rubber septum was then placed over the adapter.

A solution of about 17.02 grams (133 millimoles) naphthalene in about 133 grams dried tetrahydrofuran was charged into the round bottom three-necked flask through the rubber septum using a hypodermic syringe. This was followed by stirring for about 6 hours. The concentration of the initiator complex so prepared was determined as detailed below.

Determination of Potassium-Naphthalene Initiator Complex Concentration

A reaction apparatus comprising: (a) a 50 milliliter round bottom, single-necked flask fitted with an adapter for a rubber septum and (b) a magnetic stirring bar; and (c) an adapter was washed, dried in an oven at a temperature of 125° Centigrade and assembled warm. The magnetic stirring bar was placed inside the flask. A gaseous nitrogen source was connected to the flask through the single neck.

A valve and a pressure relief bubbler identical to that described hereinbefore with reference to the polymerization apparatus were interposed between the flask and the nitrogen source in the same manner as in assembling the polymerization apparatus.

The apparatus was evacuated, purged with nitrogen and then evacuated and purged with nitrogen a second time in order to ensure that generally all oxygen had been removed in the same manner as the polymerization apparatus in Example 1. The adapter was then fitted with a rubber septum.

A small sample of the potassium-naphthalene initiator complex hereinabove prepared was removed from the initiator complex preparation apparatus using a hypodermic syringe and weighed. An excess volume of n-butyl bromide was charged into the round bottom single-necked flask through the rubber septum using a hypodermic syringe. The previously weighed initiator complex was then added to the round bottom single-necked flask through the rubber septum using the hypodermic syringe.

The magnetic stirring bar was actuated for about two minutes using a magnetic stirring bar actuator. The magnetic stirring bar actuator was then stopped and the gaseous nitrogen inlet was removed.

The contents of the flask were poured into a 50 milliliter beaker. The flask was rinsed repeatedly with tetrahydrofuran. The tetrahydrofuran used for rinsing was added to the beaker after each rinse until the beaker was about ⅔ full of a solution. The solution was then acidified with 6 Normal sulfuric acid.

The acidified solution was electrometrically titrated with 0.1 Normal silver nitrate. The concentration of the potassium-naphthalene initiator complex was determined to be about 0.935 millimoles of potassium-naphthalene initiator per gram of initiator solution.

Polymerization

A polymerization apparatus identical to that hereinbefore described except that it used a 500 milliliter flask rather than a 250 milliliter flask was prepared, assembled, evacuated, purged with nitrogen and then evacuated and purged with nitrogen a second time, and fitted with a rubber septum, also as hereinbefore described.

About 143 milliliters of treated piperylene concentrate, prepared as hereinbefore described, was charged into the round bottom three-necked flask through the rubber septum using a hypodermic syringe. The concentrate contained about 50 grams (about 0.735 moles) of 1,3-pentadiene.

About 150 milliliters dried tetrahydrofuran was added to the concentrate through the rubber septum using a hypodermic syringe. The tetrahydrofuran-piperylene concentrate solution was cooled to a temperature of about 0° Centigrade with the aid of an ice bath. This was followed by titration with a small amount of the potassium-naphthalene initiator complex.

Titration continued until a reddish end point was observed. About 13.0 grams of the initiator complex was then added rapidly through the rubber septum with a syringe. A temperature rise in the reaction mixture to about 13° Centigrade followed the second addition of the initiator complex. The temperature of the reaction mixture was then increased to about 40° Centigrade with a warm water bath.

Analysis of the reaction mixture by vapor phase chromatography (VPC), using a gas chromatograph commercially available from Hewlett-Packard Company under the trade designation HP 5710A, showed that about 50 percent of the 1,3-pentadiene was polymerized within 30 minutes.

After about 4 hours, about 1.5 milliliters glacial acetic acid was added to the reaction mixture to terminate the polymerization reaction. The resulting solution was devolatilized using an evaporator as in Example 1. A clear, viscous liquid resulted which contained about 47.0 grams (g) polymer or about a 94 percent yield based upon the amount of 1,3-pentadiene contained in the piperylene concentrate.

The theoretical molecular weight of the polymer was 8333 grams per mole. The weight average molecular weight ($M_w$) of the polymer was about 1295 grams per mole. The number average molecular weight ($M_n$) of the polymer was about 696 grams per mole. The ratio of $M_w/M_n$ was about 1.86.

EXAMPLE 17

Polymerization of Piperylene Using the Potassium-Naphthalene Complex (Glyme Solvent)

Preparation of a Potassium-Naphthalene Complex Initiator Using Glyme as a Solvent A potassium-naphthalene complex solution was prepared in the same manner as hereinbefore described except that dried ethylene glycol dimethyl ether was used rather than dried tetrahydrofuran. The concentration of the initiator complex was determined to be about 1.0 millimoles per gram of initiator solution.

About 143 milliliters of treated piperylene concentrate was charged into a clean polymerization apparatus identical to that of Example 16 through the rubber septum using a hypodermic syringe. The concentrate contained about 50 grams (0.735 moles) of 1,3-pentadiene.

The concentrate was cooled to a temperature of about 0° Centigrade with the aid of an ice bath. This was followed by titration with a small amount of the potassium-napthalene initiator complex (ethylene glycol dimethyl ether solvent) until a reddish end point was observed. About 39.0 grams of the initiator complex was then added rapidly to the cooled concentrate. A temperature rise in the reaction mixture to about 45° Centigrade rapidly followed the second addition of the initiator complex.

The temperature of the reaction mixture was maintained at about 45° Centigrade with the aid of a heating mantle.

After about 3 hours, about 6 milliliters glacial acetic acid was added to the reaction mixture to terminate the polymerization reaction.

The resulting solution was devolatilized using an evaporator as in Example 1. A clear, viscous liquid resulted which contained about 45.0 grams of polymer. This equated to an approximate yield of about 90 percent based upon the amount of 1,3-pentadiene contained in the piperylene concentrate.

The theoretical molecular weight of the polymer was 2500 grams per mole. The polymer had a weight average molecular weight of about 1087 grams per mole, a number average molecular weight of about 729 grams per mole, and a ratio of weight average molecular weight to number average molecular weight ($M_w/M_n$) of about 1.49.

EXAMPLES 18-20

Polymerization of Piperylene With Varying Amounts of Potassium-Naphthalene Initiator Complex In this series of experiments, polymerization reaction mixtures were prepared in the same manner as Example 16. However, ingredient amounts and reaction parameters were varied. The various parameters and the results obtained therewith are listed in Tables IIIA, IIIB and IIIC, which follow. The abbreviations used in Tables IIA, IIB and IIC above are also used in Tables IIIA, IIIB and IIIC.

TABLE IIIA

| Example | V.C. | % Pip | Wt. Pip | Moles Pip | Type Init | Moles Init | Type Polar Solvent |
|---|---|---|---|---|---|---|---|
| 18 | 143 | 50 | 50.0 | 0.74 | K—naphth* | 0.020 | THF |
| 19 | 143 | 50 | 50.0 | 0.74 | K—naphth* | 0.010 | THF |
| 20 | 800 | 50 | 280.0 | 4.12 | K—naphth* | 0.06 | THF |

*Potassium-naphthalene complex

TABLE IIIB

| Example | Moles Polar Solvent | Rxn Ti | Beg. T | Peak T | ΔT | % Pip Conv. | % Poly** Recov. |
|---|---|---|---|---|---|---|---|
| 18 | 1.85 | 4-12 | −50 | 50 | 100 | 100 | @ |
| 19 | 1.85 | 4-12 | 0 | 50 | 50 | 100 | 100 |
| 20 | 7.42 | 24 | −15 | 50 | 65 | 90 | 72 |

**Variations of polymer recovered from 100% are thought to be caused by losses due to mechanical handling such as infiltration.
@Data not available due to spill during devolatilization.

TABLE IIIC

| Example | $M_w$ Theory | $M_w$ | $M_n$ | $M_w/M_n$ | General Comments |
|---|---|---|---|---|---|
| 18 | 2,500 | 1,365 | 545 | 2.50 | |
| 19 | 5,000 | 1,378 | 790 | 1.74 | |
| 20 | 4,666 | 1,902 | 1,062 | 1.79 | Severe mechanical losses in scale-up attempt. |

EXAMPLE 21

Polymerization of Piperylene Using a Metallic Sodium Ribbon As the Initiator

A polymerization apparatus (250 milliliters) identical to that hereinbefore described was prepared, assembled, twice evacuated and purged with nitrogen and fitted with a rubber septum (also as hereinbefore described).

A ribbon of metallic sodium weighing about 1.7 grams (about 0.0739 moles) was placed into the flask prior to fitting the second neck with the adaptor.

A solution consisting of about 50 milliliters (44.4 grams or 0.6167 moles) dried tetrahydrofuran, about 50 milliliters (43.3 grams or 0.4706 moles) dried toluene and about 150 milliliters (52.4 grams or 0.771 moles of 1,3-pentadiene) of treated piperylene concentrate was titrated for impurities as in Example 1. The solution was then charged into the round bottom three-necked flask through the rubber septum using a hypodermic syringe. Although a yellow color indicating initiation developed immediately, no exotherm was recorded.

The solution, or reaction mixture, was heated using a heating mantle to a temperature of about 50° Centigrade at which point the reaction became observably exothermic.

When the temperature of the reaction mixture began to drop to less than 50° Centigrade after about twenty minutes, the reaction mixture was reheated to a temperature of from about 50° Centigrade to about 55° Centigrade.

Prior to reheating, a sample of the reaction mixture was removed using a hypodermic syringe. A vapor phase chromatography chromatogram of the sample showed that only trans-1,3-pentadiene remained.

After refluxing the mixture for about 1 hour, a sample of the reaction mixture was once again removed using a hypodermic syringe. A vapor phase chromatography chromatogram of the latter sample showed that only traces of trans-1,3-pentadiene remained.

After mechanically removing an undissolved piece of sodium, excess glacial acetic acid was added, as in Example 1, to terminate the polymerization reaction.

The reaction mixture was treated in the same manner as the reaction mixture in Example 1 was treated. A clear viscous liquid resulted which contained about 52.0 grams of polymer or about a 100 percent yield based upon the amount of 1,3-pentadiene contained in the treated piperylene concentrate.

The theoretical molecular weight of the polymer was about 1418 grams per mole. The polymer had a weight average molecular weight of about 2546 grams per mole, a number average molecular weight of about 1306 grams per mole, and a ratio of weight average molecular weight to number average molecular weight (Mw/Mn) of about 1.95.

EXAMPLE 22

Polymerization of Piperylene with a Sodium Dispersion Initiator Under Reflux Conditions Preparation of a Dispersion of Sodium in Mineral Oil A 250 milliliter three-necked, ball-jointed, round bottom, fluted, homogenizing flask having a thermowell was washed and dried in an oven at a temperature of 125° Centigrade. A homogenizing stirrer, commercially available from Virtis Research Equipment, was inserted into one neck. A gas inlet was connected to a second neck. A third neck opening was left open. A thermometer was placed into the thermowell. The gas inlet was connected to a gaseous nitrogen source. A valve and a pressure relief bubbler identical to that hereinbefore described with respect to the polymerization apparatus were interposed between the gas inlet and the nitrogen source in the same manner as in the polymerization apparatus.

After assembly, the flask was purged with nitrogen in order to ensure that generally all oxygen had been removed. A flow of nitrogen was maintained through the apparatus throughout preparation of a dispersion of sodium in mineral oil.

Through the open third neck the following ingredients were added in the order listed to form a mixture: (a) about 1.3 grams of soap flakes, commercially available from Proctor and Gamble under the trade designation of Ivory Flakes; (b) about 5.3 grams of alpha-methylstyrene; and (c) about 43.4 grams of mineral oil. After stirring the mixture briefly, about 50.0 grams of metallic sodium were added thereto. The sodium had previously been cut into pieces having a size of less than about one cubic centimeter. A stopper was then placed on the third neck and the flow of nitrogen was reduced.

The mixture was heated with a heating mantle to a temperature of about 100° Centigrade in order to melt the sodium.

When generally all of the sodium had melted, the mixture was stirred at a rate of about 14,000 revolutions per minute (rpm) for about 10 minutes. The temperature of the mixture reached about 135° L Centigrade during stirring. The stirring was then discontinued and the mixture was allowed to cool to a temperature of less than about 35° Centigrade.

The dispersion of sodium in mineral oil so prepared had an average particle size of from about 2 to about 20 microns. The dispersion of sodium in mineral oil which comprised about 50 percent sodium in mineral oil was then transferred to a storage bottle.

Polymerization

A reaction apparatus identical to that used in Example 1 except that a 2-liter flask was used rather than a 250-milliliter flask was washed, dried in an oven at a temperature of 125° Centigrade and assembled warm.

An addition apparatus identical in every respect to the reaction apparatus except that the flask size was 1-liter rather than 2-liter was similarly washed, dried and assembled warm.

After assembly, both the reaction apparatus and the addition apparatus were evacuated, purged with nitrogen and then evacuated and purged with gaseous nitrogen a second time in the same manner as the polymerization apparatus in Example 1, fitted with an adapter and each of the adapters thereafter capped with a rubber septum as in Example 1.

A solution consisting of about 760 milliliters (581.1 grams, 9.373 moles) dried tetrahydrofuran, about 250 milliliters (216.5 grams, 2.353 moles) dried toluene and about 89 milliliters (39.2 grams, 0.580 moles of 1,3-pentadiene) of piperylene concentrate was charged into the reaction apparatus through the rubber septum using a hypodermic syringe.

Similarly, a solution consisting of about 40 milliliters (30.5 grams, 0.492 moles) dried tetrahydrofuran and about 320 milliliters (160 grams, 2.352 moles of 1,3-pentadiene) of piperylene concentrate was charged into the addition apparatus.

The solutions in the reaction apparatus and the addition apparatus were titrated with a 2.3 Normal n-butyllithium in hexane solution, as in Example 1, until a light yellow end-point was observed. The light yellow end-point indicated inactivation of trace amounts of impurities. Tetrahydrofuran was included to allow observation of the light yellow end-point.

About 10.4 grams of the 50 percent sodium dispersion (5.2 grams or 0.226 moles of sodium) prepared as hereinbefore described were charged in one shot into the reaction apparatus through the rubber septum using a hypodermic syringe. The reaction mixture rapidly turned yellow and the temperature of the reaction mixture rose to about 40° Centigrade. The temperature of the reaction mixture was then increased to about 50° Centrigrade with the aid of a heating mantle.

A transfer mechanism which comprised two 12-inch, 16 gauge needles connected by a length of ⅛-inch outside diameter polyethylene tubing was employed to transfer the solution from the addition apparatus to the reaction apparatus.

The following procedure was used to connect the transfer mechanism to the two apparatuses. First, one of the needles was inserted in to the addition apparatus through the rubber septum in such a manner that the needle was not immersed in the solution. Second, the vent to the atmosphere, of the addition apparatus, was closed. Third, after a period of time, the second needle was inserted through the septum of the reaction apparatus so that the needle was not immersed in the reaction mixture. Fourth, the needle inserted in the addition apparatus was then positioned so that a portion of the needle was inserted into the solution. In this manner, the solution from the addition flask was slowly fed under gaseous nitrogen pressure into the reaction flask.

The heating mantle was removed and the rate of feed of the solution from the addition flask was regulated so that steady reflux of the reaction mixture in the reaction apparatus was obtained. The temperature of the reaction mixture during reflux was about 65° Centigrade.

The reflux conditions were maintained throughout the addition of the solution from the addition flask. The addition lasted for a period of from about 25 to about 30 minutes. The color of the reaction mixture during this period changed from light yellow to dark brown.

A vapor phase chromatography chromatogram showed that no residual piperylene, or 1,3-pentadiene monomer, remained at this point.

The reaction mixture was allowed to cool to a temperature of about 45° Centigrade. The polymerization reaction was then terminated by adding excess (about 13 milliliters) glacial acetic acid to the reaction mixture.

The reaction mixture was treated in the same manner as the reaction mixture in Example 1. A clear viscous liquid resulted which contained about 190.9 grams of polymer. This equated to a yield of about 96 percent based upon the amount of 1,3-pentadiene contained in the piperylene concentrate. The theoretical molecular weight was about 1763 grams per mole. The polymer had a weight average molecular weight of about 1088 grams per mole, a number average molecular weight of about 661 grams per mole and a ratio of weight average molecular weight to number average molecular weight (Mw/Mn) of about 1.65. The viscosity in centistokes at 65° Fahrenheit was in the range of from about 50 to about 60.

EXAMPLE 23

Polymerization of Piperylene from an Untreated Feedstream Using a Sodium Dispersion Initiator The apparatus of Example 22 was used in this example. A solution consisting of about 800 milliliters (710.4 grams or 9.866 moles) dried tetrahydrofuran, about 250 milliliters (216.5 grams or 2.353 moles) dried toluene and about 80 milliliters (33.1 grams of 0.487 moles of 1,3-pentadiene) of an untreated piperylene cut, or concentrate, was charged into the reaction apparatus through the rubber septum using a hypodermic syringe.

The untreated piperylene cut contained about 50 percent, based on total cut weight, 1,3-pentadiene.

Similarly, about 320 milliliters (135.9 grams or 1.999 moles 1,3-pentadiene) of the untreated piperylene cut was charged into the addition apparatus. Tetrahydrofuran which had been added to the addition flask in Example 22 was purposely omitted. About 10.4 grams of the 50 percent sodium dispersion (5.2 grams or 0.226 moles sodium) was then charged in one shot into the reaction apparatus through the rubber septum using a hypodermic syringe.

Temperature-controlled addition of the solution from the addition apparatus was accomplished in the same manner as in Example 22.

Termination of polymerization and subsequent treatment of the reaction mixture was also the same as in Example 22.

A clear liquid resulted which contained about 163.4 grams of polymer. This equated to a yield of about 85 percent based upon the amount of 1,3-pentadiene contained in the piperylene cut. The theoretical molecular weight was about 1199 grams per mole. The polymer had a weight average molecular weight of about 1618 grams per mole, a number average molecular weight of about 978 grams per mole, and a ratio of weight average molecular weight to number average molecular weight (Mw/Mn) of about 1.66.

EXAMPLES 24–29

Polymerization of Piperylene Using Varying Amounts of Sodium Dispersion Initiator In this series of experiments, the polymerization apparatus of Example 22 was used. However, ingredient amounts and reaction parameters were varied from those of Example 22. The various parameters and the results obtained therewith are listed in Tables IVA, IVB, and IVC, which follow. The abbreviations used in Tables IIA, IIB and IIC are also used in Table IVA, IVB and IVC. In addition, viscosity in terms of centistokes at 10° Fahrenheit and 210° Fahrenheit was determined in several instances.

TABLE IVA

| Example | V.C. | % Pip | Wt. Pip | Moles Pip | Type Init | Moles Init | Type Polar Solvent |
|---|---|---|---|---|---|---|---|
| 24 | 75 | 50 | 25.0 | 0.37 | Na Dis-[1] persion | 0.022 | Glyme |
| 25 | 75 | 50 | 25.0 | 0.37 | Na Dis-[1] persion | 0.011 | THF |
| 26 | 75 | 50 | 25.0 | 0.37 | Na Dis-[1] persion | 0.005 | THF |
| 27 | 150 | 50 | 52.4 | 0.77 | Na Dis-[2] persion | 0.025 | THF |
| 28 | 150 | 50 | 52.4 | 0.77 | Na Dis-[2] persion | 0.057 | THF |
| 29 | 150 | 50 | 52.4 | 0.77 | Na Dis-[2] persion | 0.057 | THF |

[1] 25% sodium dispersion in mineral oil.
[2] 50% sodium dispersion in mineral oil.

TABLE IVB

| Example | Moles Polar Solvent | Type Transfer Agent | Moles Transfer Agent | Rxn T. | Beg. T | Peak T | ΔT | T Pip Conv. |
|---|---|---|---|---|---|---|---|---|
| 24 | 0.289 | Toluene | 0.471 | 5.0 | −20 | 60 | 80 | >95 |
| 25 | 0.430 | Toluene | 0.471 | 2.5 | 0 | 60 | 60 | 100 |
| 26 | 0.430 | Toluene | 0.471 | 3.5 | 25 | 60 | 35 | >95 |
| 27 | 0.740 | Toluene | 0.941 | 1.5 | 25 | 60 | 35 | >95 |
| 28 | 0.740 | Toluene | 0.941 | 0.5 | 25 | 50 | 25 | 100 |
| 29 | 0.740 | Cumene | 0.611 | 0.75 | 25 | 50 | 15 | 100 |

TABLE IVC

| Example | % Poly Recov. | $M_w$ Theory | $M_w$ | $M_n$ | $M_w/M_n$ | Viscosity 100° F. | Viscosity 210° F. |
|---|---|---|---|---|---|---|---|
| 24 | 88 | 2,330 | 1,554 | 917 | 1.69 | — | — |
| 25 | 98 | 4,659 | 2,206 | 1,175 | 1.88 | — | — |
| 26 | 90 | 9,319 | 2,191 | 1,331 | 1.65 | — | — |
| 27 | 87 | 4,190 | 2,597 | 1,508 | 1.72 | 1760 | — |
| 28 | 96 | 1,839 | 2,475 | 1,629 | 1.52 | 1300–1700 | — |
| 29 | 97 | 1,839 | 2,795 | 1,652 | 1.69 | 1290–1760 | — |

— Not measured.

EXAMPLES 30–40

Additional Polymerizations of Piperylene Using Sodium Dispersion Initiators Under Reflux Conditions In this series of examples, polymerization reaction mixtures and reaction and addition apparatuses were prepared in the same manner as in Example 22. However, ingredient amounts and reaction parameters were varied. The various parameters and the results obtained therewith are listed in Table VA, VB and VC which follow. The abbreviations used in Tables IIA, IIB and IIC are also used in Table VA, VB and VC. In addition, viscosity in terms of centistokes at 65° Fahrenheit and at 212° Fahrenheit was determined in several instances.

TABLE VA

| Example | V.C. | % Pip | Wt. Pip | Moles Pip | Type[c] Init | Moles Init | Type Polar Solvent |
|---|---|---|---|---|---|---|---|
| 30 | 30[a] | 50 | 10.5 | 0.15 | Na dispersion | 0.057 | THF |
|    | 120[b] | 50 | 41.9 | 0.62 |  |  |  |
| 31 | 30[a] | 50 | 10.5 | 0.15 | Na dispersion | 0.057 | THF |
|    | 120[b] | 50 | 41.9 | 0.62 |  |  |  |
| 32 | 30[a] | 50 | 10.5 | 0.15 | Na dispersion | 0.057 | THF |
|    | 120[b] | 50 | 41.9 | 0.62 |  |  |  |
| 33 | 80[a] | 70 | 39.2 | 0.58 | Na dispersion | 0.226 | THF |
|    | 320[b] | 70 | 160.0 | 2.35 |  |  |  |
| 34 | 80[a] | 70 | 39.2 | 0.58 | Na dispersion | 0.226 | THF |
|    | 320[b] | 70 | 160.0 | 2.35 |  |  |  |
| 35 | 80[a] | 70 | 39.2 | 0.58 | Na dispersion | 0.226 | THF |
|    | 320[b] | 70 | 160.0 | 2.35 |  |  |  |
| 36 | 80[a] | 70 | 39.2 | 0.58 | Na dispersion | 0.260 | THF |
|    | 320[b] | 70 | 160.0 | 2.35 |  |  |  |
| 37 | 80[a] | 70 | 39.2 | 0.58 | Na dispersion | 0.260 | THF |
|    | 320[b] | 70 | 160.0 | 2.35 |  |  |  |
| 38 | 80[a] | 65 | 37.0 | 0.54 | Na dispersion | 0.260 | THF |
|    | 320[b] | 65 | 151.0 | 2.22 |  |  |  |
| 39 | 80[a] | 55[d] | 33.1 | 0.49 | Na dispersion | 0.260 | THF |
|    | 320[b] | 55[d] | 135.9 | 2.00 |  |  |  |
| 40 | 80[a] | 55[d] | 33.1 | 0.49 | Na dispersion | 0.260 | THF |
|    | 320[b] | 55[d] | 135.9 | 2.00 |  |  |  |

[a] Amount placed in reaction flask
[b] Amount placed in addition flask
[c] 50 Percent sodium dispersion in mineral oil
[d] 55 Percent piperylene concentrate (untreated) cyclopentadiene content ~3 percent based on concentrate weight

TABLE VB

| Example | Moles Polar Solvent | Type Transfer Agent | Moles Transfer Agent | Rxn T. | Beg. T | Peak T | ΔT | T Pip Conv. |
|---|---|---|---|---|---|---|---|---|
| 30 | 0.617[a] 0.123[b] | Toluene | 0.941 | 0.25 | 40 | 60 | 20 | 100 |
| 31 | 2.343[a] 0.123[b] | Toluene | 0.471 | 0.50 | 20 | 65 | 45 | >95 |
| 32 | 0.987[a] 0.123[b] | Toluene | 0.471 | 0.50 | 20 | 65 | 45 | >95 |
| 33 | 9.373[a] 0.493[b] | Toluene | 2.353 | 0.50 | 20 | 65 | 45 | 100 |
| 34 | 9.373[a] 0.493[b] | Toluene | 2.353 | 0.50 | 20 | 65 | 45 | 100 |
| 35 | 9.373[a] 0.493[b] | Toluene | 2.353 | 0.50 | 20 | 65 | 45 | 100 |
| 36 | 9.373[a] | Tol- | 2.353 | 0.50 | 20 | 65 | 45 | 100 |

TABLE VB-continued

| Example | Moles Polar Solvent | Type Transfer Agent | Moles Transfer Agent | Rxn T. | Beg. T | Peak T | ΔT | T Pip Conv. |
|---|---|---|---|---|---|---|---|---|
| 37 | 9.373[a] 0.493[b] | Toluene | 2.353 | 0.50 | 20 | 65 | 45 | 100 |
| 38 | 9.373[a] 0.493[b] | Toluene | 2.353 | 0.35 | 20 | 65 | 45 | 100 |
| 39 | 9.373[a] 0.493[b] | Toluene | 2.353 | 0.35 | 20 | 65 | 45 | 100 |
| 40 | 9.373[a] 0.493[b] | Toluene | 2.353 | 0.35 | 20 | 65 | 45 | >95 |

[a] Amount placed in reaction flask.
[b] Amount placed in addition flask.

TABLE VC

| Example | % Poly Recov. | $M_w$ Theory | $M_w$ | $M_n$ | $M_w/M_n$ | Viscosity 65° F. | Viscosity 212° F. |
|---|---|---|---|---|---|---|---|
| 30 | 99 | 1,839 | 1,609 | 1,117 | 1.44 | 340 | — |
| 31 | 83 | 1,839 | 1,280 | 849 | 1.51 | 165–200 | — |
| 32 | 75 | 1,839 | 1,559 | 1,014 | 1.54 | 500 | — |
| 33 | 96 | 1,763 | 1,074 | 624 | 1.72 | 75 | — |
| 34 | 98 | 1,763 | 995 | 645 | 1.54 | 65 | — |
| 35 | 92 | 1,763 | 1,245 | 709 | 1.75 | 125 | — |
| 36 | 99 | 1,534 | 1,022 | 568 | 1.80 | 85 | — |
| 37 | 88.5 | 1,534 | 1,253 | 575 | 2.18 | 140 | 10.10 |
| 38 | 99 | 1,446 | 865 | 485 | 1.78 | 32 | 5.10 |
| 39 | 97 | 1,300 | 1,105 | 545 | 2.03 | 50 | 5.95 |
| 40 | 91 | 1,300 | 1,190 | 477 | 2.49 | 65 | 7.25 |

— Not measured.

In a manner similar to the foregoing, additional polymers of 1,3-pentadiene are prepared by using other anionic polymerization initiators and organic polar solvents, both of which are hereinabove identified. In particular, polymers of 1,3-pentadiene are prepared by using hydrogenated polypiperylene, rather than mineral oil, as a dispersing medium. In addition, polymers of 1,3-pentadiene are prepared when the chain transfer agent is divided between the addition apparatus and the reaction apparatus.

EXAMPLE 41

Hydrogenation of an Unsaturated Polymer of 1,3-Pentadiene

A hydrogenation apparatus comprising a 2-liter stainless steel high pressure reaction vessel, commercially available from Parr Instrument Company, equipped with a pulley-driven stirrer, a cooling loop, a pressure transducer, a hydrogen inlet valve, a vent valve, a thermowell, and a frangible assembly with a rupture disk rated for 1029 pounds per square inch gauge, commercially available from Fike Metal Products Corporation, was assembled.

The vent valve and the frangible assembly were each connected by separate lines to a blowdown tank which was constantly purged with gaseous nitrogen and vented to the atmosphere. The cooling loop was connected to a cooling water supply line. The pressure transducer was connected to a pressure recorder. Eight thermocouples were inserted into the thermowell and connected to a 16 point recording apparatus commercially available from Honeywell under the trade designation Honeywell Electronik-15.

The yield of polypiperylene prepared in Example 22 was about 190.9 grams. The polypiperylene had a weight average molecular weight of about 1088 grams per mole and a number average molecular weight of about 661 grams per mole.

Two additional samples of polypiperylene were prepared in the same manner as in Example 22. The yield of a first sample was about 188.9 grams. The first sample had a weight average molecular weight of about 1221 grams per mole and a number average molecular weight of 734 grams per mole. The yield of a second sample was about 188.0 grams. The second sample had a weight average molecular weight of about 1113 grams per mole and a number average molecular weight of about 566 grams per mole.

The polypiperylene prepared in Example 22 was blended with the polypiperylene prepared in the two additional samples for a total amount of about 567.8 grams of a polypiperylene blend.

The following ingredients were placed into the hydrogenation apparatus in the order listed to form a reaction mixture: (a) about 31.4 grams of hydrogenation catalyst; (b) about 600 milliliters (412 grams) heptane; and (c) about 524 grams of the piperylene blend. The catalyst was a 5 percent by weight palladium on a carbon support, commercially available from Matthey-Bishop, Inc., under the trade designation BD-136 type 31A. The hydrogenation apparatus was then closed, sealed and pressurized to a pressure of about 750 pounds per square inch gauge with gaseous hydrogen.

The apparatus was heated until a temperature of about 30° Centigrade was recorded on the temperature recording apparatus.

After a short period of 5 to 10 minutes, an exotherm of about 60° Centigrade developed. The exotherm was accompanied by a rapid decrease in pressure to about 0 pounds per square inch gauge. The hydrogenation apparatus was then repressurized with hydrogen to a pressure of about 750 pounds per square inch gauge.

The apparatus was thereafter repressurized about once each hour until no further pressure decrease was observed—an interval of about 7 hours. The temperature recorded during the interval fluctuated between about 60° Centigrade and about 150° Centigrade primarily due to hydrogen pressure fluctuations. The apparatus was then allowed to cool to a temperature of about 25° Centigrade after which excess hydrogen was vented to the atmosphere.

The reaction mixture was removed from the hydrogenation apparatus and filtered using #3 filter paper to remove the catalyst. Generally all of the heptane was then removed by flash distillation at a temperature of from about 90° Centigrade to about 100° Centigrade and a reduced pressure of about 10 millimeters of mercury. That which remained was hydrogenated polypiperylene.

The yield of hydrogenated polypiperylene was about 500 grams. A small sample of the hydrogenated polypiperylene was evaluated for the absence of olefinic hydrogen using a proton NMR spectrometer commercially available from Varian Associates under the trade designation Varian ®T-60. The proton NMR spectrometer indicated that no olefinic hydrogen was present. Thus, hydrogenation of substantially all double bonds in the polypiperylene starting material had been accomplished.

Based upon the weight of the hydrogenated polypiperylene, it is believed that a small amount of residual heptane remained. More sophisticated techniques for removal of the heptane should result in a purer product. A simple technique would add a second distillation at a higher temperature of about 150° Centigrade under a reduced pressure of from about 0.5 to about 1 millimeter of mercury.

The hydrogenated polypiperylene of the present invention prepared in Example 41 was tested in a series of standard lubricant tests as set forth in Experiments 42-44.

EXAMPLE #42

Air Blown Oxidation Test

In this test, air was bubbled into 100 milliliters of hot fluid (350° Fahrenheit) at the rate of 5 liters/hour for 5 days. The weight, to the nearest 0.1 gram, the viscosity and the acidity of the fluid were recorded before and after the test and compared. The magnitude of the changes observed was then used to establish the relative oxidative stability of the fluid. The loss in weight due to volatility was 3.0 percent. The viscosity change of the fluid at 100° Fahrenheit was an increase of 251 percent. The Total Acid Number (milligrams of potassium hydroxide per gram of fluid) was 16.8.

EXAMPLE 43

Rotary Bomb Oxidation Test

The procedure of ASTM D2272 was followed. The procedure called for the loading of a special testing bomb with 50 grams fluid, 5 grams water, a copper catalyst and 90 pounds per square inch gauge oxygen, followed by heating of the bomb to 150° Centigrade. The time elapsed for a 25 pound pressure drop was measured with and without an inhibitor. The inhibitor was an alkylated-alpha-phenyl-naphthylamine oxidation inhibitor commercially available from Ciba Geigy, Inc. under the trade designation IRGANOX® LO6. Without an inhibitor, the time was 12 minutes. The time with the inhibitor was 23 hours, 10 minutes.

EXAMPLES 44

Elastomer Compatibility Test

Tests were conducted at 70° Centigrade in tightly capped 4 ounce glass bottles using a piece of elastomer approximately 1 square inch in size and 50 milliliters of fluid. The Shore Hardness D, the weight, and the volume of each elastomer sample were determined before starting the test and then again at 28 days. The volume of the elastomers was measured by weighing the elastomer sample first in air and then in water. The results obtained are summarized in Table VI, below.

TABLE VI

| | Elastomer Compatibility Tests | | |
|---|---|---|---|
| Rubber | Change In Shore D Hardness | Percent Volume Change | Percent Weight Change |
| Chloroprene | +5 | +0.25 | −0.85 |
| Epichlorohydrin | +1 | −1.24 | −0.08 |
| Fluoroelastomer | 0 | +1.04 | +0.58 |
| Nitrile | +3 | −6.5 | −6.18 |
| Silicone | −5 | +8.72 | +5.07 |

Results similar to those shown in Examples 42-44 are obtained with other hydrogenated polypiperylenes prepared in accordance with the present invention.

EXAMPLE 45

Copolymerization of Piperylene and Styrene

A stirred polymerization apparatus identical to that used in Experiment 1 was washed, dried in an oven at a temperature of 125° Centigrade, assembled warm and then evacuated, purged with nitrogen and then evacuated and purged with nitrogen a second time in the same manner as the polymerization apparatus of Example 1.

A hypodermic syringe was used to add 128.6 milliliters of treated piperylene concentrate, prepared as hereinbefore described, to the polymerization apparatus through the rubber septum. The concentrate contained 44.9 grams (0.6615 moles) of piperylene monomer. A hypodermic syringe was used to add 8.4 milliliters of styrene monomer (7.64 grams or 0.0735 moles) to the polymerization apparatus through the rubber septum. The styrene monomer had previously been dried over calcium hydride and passed through a bed of activated alumina.

The contents of the apparatus were cooled to a temperature of about 0° Centigrade with the aid of an ice bath. This was followed by addition via syringe of 7.5 milliliters of a 2.6 Molar solution of n-butyllithium in hexane (about 1.25 grams or 0.0195 moles of n-butyllithium). No immediate reaction was observed.

After addition of about 1 milliliter dried tetrahydrofuran by syringe, the ice bath was removed and the contents of the apparatus were allowed to exothermically increase in temperature to a temperature of about 30° Centigrade.

Analysis of the contents by vapor phase chromatography as in Example 22 showed that after two hours a portion of the 1,3-pentadiene was still unreacted.

The contents of the flask were then stirred for an additional 12 hours at a temperature of about 25° Centigrade. Analysis of the contents by vapor phase chromatography showed that all of the styrene and nearly all of the 1,3-pentadiene had reacted.

The contents were neutralized with about 1.5 milliliters glacial acetic acid and devolatilized using an evaporator as in Example 1. A clear, viscous resin resulted which contained about 44.5 grams polymer or about an 85 percent yield based upon amount of 1,3-pentadiene in the piperylene concentrate. The resin had an olefinic to aromatic proton ratio of 3.8 to 1 as determined by nuclear magnetic resonance spectroscopy using a Varian T-60 Proton NMR commercially available from Varian Associates.

In a manner similar to the foregoing, copolymers of 1,3-pentadiene and other anionically polymerizable monomers such as vinyl toluene, alpha-methylstyrene and t-butylstyrene are prepared.

EXAMPLE 46

Hydroxylation of Polypiperylene

A 500 milliliter round bottom, three-necked flask having a thermowell was used as a hydroxylation apparatus. A mechanical stirrer was fitted into one of the three necks. A reflux condenser was fitted into a second of the three necks. 130 grams of polypiperylene prepared as in Example 24, 150 milliliters of methylene chloride, 17 milliliters of formic acid and 32 grams of a 30 percent solution of hydrogen peroxide (0.282 moles hydrogen peroxide) were added to the flask via the remaining neck which was then plugged with a stopper.

A warm water bath was applied to the flask to aid in starting hydroxylation. The bath was removed when the contents of the flask reached a temperature of about 45° Centigrade.

After about two hours, the temperature of the contents began to drop to a temperature of less than 45°

Centigrade. A heating mantle was used to heat the contents to a temperature of 45° Centigrade and to maintain the temperature at that level for an additional four hours. The heating mantle was then removed and the contents of the flask were allowed to cool to room temperature.

After cooling, the contents were removed from the flask and transferred to a separatory funnel where the contents were separated into layers, one of which contained a major amount of methylene chloride. The methylene chloride layer was washed with water and then dried over anhydrous sodium sulfate.

The methylene chloride solvent was removed from the methylene chloride layer using an evaporator as in Example 1 to yield about 120 grams of a light yellow resin. Infrared spectroscopy analysis of the resin showed bands for hydroxyl and carbonyl groups. Nuclear magnetic resonance spectroscopy analysis of the resin showed (a) a 15 percent decrease in the level of unsaturation as compared with the level of unsaturation of the polypiperylene before hydroxylation and (b) a hydroxyl content of about 0.0022 moles of hydroxyl groups per gram of resin.

In a manner similar to the foregoing, polypiperylenes prepared using other initiators and organic polar solvents, both of which are described herein, are hydroxylated. In addition, polypiperylenes prepared in accordance with this invention are also epoxidized, phenolated, sulphonated and brominated.

What is claimed is:

1. A method for anionically preparing polymers of 1,3-pentadiene from a distillation cut available as a by-product of crude oil cracking operations, said distillation cut being a mixture of saturated and unsaturated hydrocarbon molecules, at least 50 percent by weight of said molecules having five carbon atoms per molecule, said mixture comprising cis-1,3-pentadiene, trans-1,3-pentadiene, cyclopentadiene and other 5-carbon atom molecules, the method comprising:
  (a) forming a treated mixture by treating the mixture of saturated and unsaturated hydrocarbon molecules with an alkali metal, said treatment being sufficient to inactivate generally all (1) cyclopentadiene monomer, (2) active hydrogen compounds and (3) other compounds having a chain terminating functionality which are present in the mixture;
  (b) separating the inactivated monomer, inactivated active hydrogen compounds, other inactivated compounds and alkali metal from the treated mixture to yield a treated polymerization feedstream;
  (c) initiating polymerization of the cis- and trans-1,3-pentadiene contained in the treated polymerization feedstream by contacting, in an inert atmosphere, said treated polymerization feedstream with an initiator combination, said initiator combination comprising an organic polar solvent in conjunction with an anionic polymerization inhibitor, the anionic polymerization initiator being selected from the group consisting of (1) alkali metals, (2) dispersions of an alkali metal in an aliphatic hydrocarbon, (3) organo-alkali metal compounds.

2. The method of claim 1 wherein the organic polar solvent is selected from the group consisting of tetrahydrofuran, ethylene glycol dimethyl ether, tetramethylethylenediamine, ethyl ether, diethylene glycol dimethyl ether, and hexamethylphosphoramide.

3. The method of claim 1 wherein the alkali metal used to treat the mixture of saturated and unsaturated hydrocarbon molecules is sodium.

4. The method of claim 1 wherein the anionic polymerization initiator is an organo-alkali metal compound.

5. The method of claim 4 wherein the organo-alkali metal compound is an organo-lithium compound selected from the group consisting of methyllithium, isopropyllithium, n-butyllithium, t-butyllithium, sec-butyllithium, t-octyllithium, n-decyllithium, phenyllithium, naphthyllithium, 4-butylphenyllithium, p-tolyllithium, 4-phenylbutyllithium and cyclohexyllithium.

6. The method of claim 1 wherein the anionic polymerization initiator is an alkali metal selected from the group consisting of sodium, potassium, lithium, sodium-potassium alloys, sodium-lithium alloys and lithium-potassium alloys.

7. The method of claim 1 wherein the anionic polymerization initiator is a dispersion of an alkali metal in an aliphatic hydrocarbon, the alkali metal being selected from the group consisting of sodium, potassium, lithium, sodium-potassium alloys, sodium-lithium alloys and lithium-potassium alloys.

8. The method of claim 7 wherein the aliphatic hydrocarbon is selected from the group consisting of mineral oil and hydrogenated polypiperylenes having a boiling point in the range of from about 100° Centigrade to about 400° Centigrade.

9. The method of claim 1 wherein the inert atmosphere comprises a gaseous element selected from the group consisting of helium, neon, argon, nitrogen and mixtures thereof.

10. The method of claim 1 wherein the anionic polymerization initiator is selected from the group consisting of lithium, potassium, dispersions of lithium in an aliphatic hydrocarbon, dispersions of potassium in an aliphatic hydrocarbon, organo-lithium compounds and organo-potassium compounds.

11. The method of claim 10 wherein the polymer of 1,3-pentadiene has polymerized therein three constitutional repeating units:

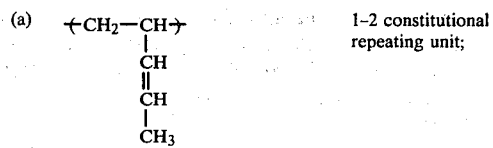

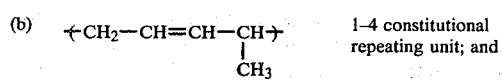

said constitutional repeating units being present in amounts based on total amount of constitutional repeating units as follows
  (a) from about 40 to about 56 percent,
  (b) from about 6 to about 14 percent, and
  (c) from about 37 to about 47 percent.

12. The method of claim 1 wherein the anionic polymerization initiator is selected from the group consisting of (a) dispersions of metallic sodium in an aliphatic hydrocarbon, (b) metallic sodium, and (c) organosodium compounds.

13. The method of claim 12 wherein the polymer of 1,3-pentadiene has polymerized therein three constitutional repeating units:

(a) 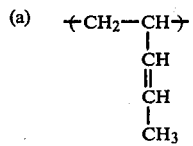 1-2 constitutional repeating unit;

(b) 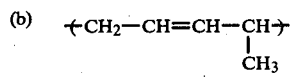 1-4 constitutional repeating unit; and (c) 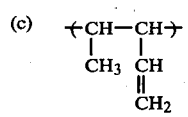 3-4 constitutional repeating unit, said constitutional repeating units being present in amounts based on total amount of constitutional repeating units as follows
(a) from about 55 to about 63 percent,
(b) from about 10 to about 16 percent, and
(c) from about 23 to about 31 percent.

14. A method for anionically preparing polymers of 1,3-pentadiene from a distillation cut available as a by-product of crude oil cracking operations, said distillation cut being a mixture of saturated and unsaturated hydrocarbon molecules, at least 50 percent by weight of said molecules having five carbon atoms per molecule, said mixture comprising cis-1,3-pentadiene, trans-1,3-pentadiene, cyclopentadiene and other 5-carbon atom molecules, the method comprising:
(a) forming a treated mixture by treating the mixture of saturated and unsaturated hydrocarbon molecules with an alkali metal, said treatment being sufficient to inactivate of generally all (1) cyclopentadiene, (2) active hydrogen compounds and (3) other compounds having a chian terminating functionality which are present in the mixture;
(b) separating the inactivated cyclopentadiene, inactivated active hydrogen compounds, other inactivated compounds and alkali metal from the treated mixture to yield a treated polymerization feedstream;
(c) dividing the treated polymerization feedstream into at least a first portion and a second portion, the second portion being larger than the first portion;
(d) initiating polymerization of the cis- and trans-1,3-pentadiene contained in the treated polymerization feedstream by contacting, in an inert atmosphere, the first portion of the treated polymerization feedstream with an initiator complex, the initiator complex comprising (1) a dispersion of an alkali metal in an aliphatic hydrocarbon in conjunction with (2) an organic polar solvent; and
(e) continuing polymerization of the cis- and trans-1,3-pentadiene contained in the treated polymerization feedstream by adding the second portion of the treated polymerization feedstream to the first portion thereof, the second portion being added at a rate sufficient to attain and maintain steady reflux conditions until addition of the second portion is complete.

15. The method of claim 14 wherein the organic polar solvent is selected from the group consisting of tetrahydrofuran, ethylene glycol dimethyl ether, tetramethylenediamine, ethyl ether, diethylene glycol dimethyl ether, and hexamethylphosphoramide.

16. The method of claim 14 wherein the alkali metal which is dispersed in the aliphatic hydrocarbon is selected from the group consisting of sodium, potassium, lithium, sodium-potassium alloys, sodium-lithium alloys and lithium-potassium alloys.

17. The method of claim 14 wherein the aliphatic hydrocarbon is selected from the group consisting of mineral oils having a boiling point in the range of from about 100° Centigrade to about 400° Centigrade and hydrogenated polypiperylenes.

18. The method of claim 14 wherein a chain transfer agent selected from the group consisting of toluene, cumene and xylene is added to the first portion of the treated polymerization feedstream in conjunction with the organic polar solvent.

19. The method of claim 18 wherein the chain transfer agent is also added to the second portion of the treated polymerization feedstream.

20. The method of claim 14 wherein the inert atmosphere comprises a gaseous element selected from the group consisting of helium, neon, argon, nitrogen and mixtures thereof.

21. A method for anionically preparing polymers of 1,3-pentadiene from a distillation cut available as a by-product of crude oil cracking operations, said distillation cut being a mixture of saturated and unsaturated hydrocarbon molecules, at least 50 percent by weight of said molecules having five carbon atoms per molecule, said mixture comprising cis-1,3-pentadiene, trans-1,3-pentadiene, cyclopentadiene and other 5-carbon atom molecules, the method comprising:
(a) forming a treated mixture treating the mixture of saturated and unsaturated hydrocarbon molecules with an alkali metal, said treatment being sufficient to inactivate of generally all (1) cyclopentadiene, (2) active hydrogen compounds and (3) other compounds having a chain terminating functionality which are present in the mixture;
(b) separating the inactivated cyclopentadiene, inactivated active hydrogen compounds, other inactivated compounds and alkali metal from the treated mixture to yield a treated polymerization feedstream;
(c) initiating polymerization of the cis- and trans-1,3-pentadiene contained in the treated polymerization feedstream by contacting, in an inert atmosphere, said treated polymerization feedstream with an anionic polymerization initiator, the initiator being selected from the group consisting of alkali metal-polycene complexes and addition compounds of an alkali metal with alpha-methylstyrene.

22. The method of claim 21 wherein the anionic polymerization initiator is an alkali metal-polycene complex.

23. The method of claim 22 wherein the alkali metal of the alkal metal-polycene complex is selected from the group consisting of lithium, potassium, sodium, lithium-potassium alloys, lithium-sodium alloys and potassium-sodium alloys.

24. The method of claim 22 wherein the polycene of the alkali metal-polycene complex is selected from the group consisting of naphthalene, anthracene, phenanthracene, biphenyl, chrysene or p-terphenyl.

25. The method of claim 21 wherein the anionic polymerization initiator is a potassium-naphthalene complex.

26. The method of claim 21 wherein the anionic polymerization initiator is an addition compound of an alkali metal with alpha-methylstyrene.

27. The method of claim 26 wherein the alkali metal of the addition compound is selected from the group consisting of sodium, potassium, sodium-potassium alloys, sodium-lithium alloys, and lithium-potassium alloys.

28. The method of claim 21 wherein the inert atmosphere comprises a gaseous element selected from the group consisting of helium, neon, argon, nitrogen and mixtures thereof.

29. A method for anionically preparing polymers of 1,3-pentadiene from a distillation cut available as a by-product of crude oil cracking operations, said distillation cut being a mixture of saturated and unsaturated hydrocarbon molecules, at least 50 percent by weight of said molecules having five carbon atoms per molecule, said mixture comprising cis-1,3-pentadiene, trans-1,3-pentadiene, cyclopentadiene and other 5-carbon atom molecules, the method comprising contacting, in an inert atmosphere, said mixture of saturated and unsaturated hydrocarbon molecules with an amount of an initiator combination, the initiator combination comprising an organic polar solvent and an anionic polymerization initiator selected from the group consisting of alkali metals, dispersions of an alkali metal in an aliphaic hydrocarbon, and organoalkali metal compounds, the amount being sufficient to (a) inactivate generally all (1) cyclopentadiene, (2) active hydrogen compounds and (3) other compounds having a chain terminating functionality which are present in the mixture of saturated and unsaturated hydrocarbon molecules, and (b) initiate polymerization of the cis- and trans-1,3-pentadiene contained in said mixture.

30. A method for anionically preparing polymers of 1,3-pentadiene from a distillation cut available as a by-product of crude oil cracking operations, said distillation cut being a mixture of saturated and unsaturated hydrocarbon molecules, at least 50 percent by weight of said molecules having five carbon atoms per molecule, said mixture comprising cis-1,3-pentadiene, trans-1,3-pentadiene, cyclopentadiene and other 5-carbon atom molecules, the method comprising:

a. dividing the mixture of saturated and unsaturated hydrocarbon molecules into at least a first portion and a second portion, the second portion being larger than the first portion;

b. initiating polymerization of the cis- and trans-1,3-pentadiene contained in the mixture of saturated and unsaturated hydrocarbon molecules by contacting, in an inert atmosphere, the first portion of the mixture with an amount of an initiator complex, the initiator complex comprising (1) a dispersion of an alkali metal in an aliphatic hydrocarbon in conjunction with (2) an organic polar solvent, the amount of initiator complex being sufficient to (a) inactivate generally all (i) cyclopentadiene, (ii) active hydrogen compounds, and (iii) other compounds having a chain terminating functionality which are present in the mixture of saturated and unsaturated hydrocarbon molecules, and (b) initiate polymerization of the cis- and trans-1,3-pentadiene contained in said mixture; and c. continuing polymerization of the cis- and trans-1,3-pentadiene contained in the mixture of saturated and unsaturated hydrocarbon molecules by adding the second portion thereof to the first portion thereof, the second portion being added at a rate sufficient to attain and maintain steady reflux conditions until addition of the second portion is complete.

31. A method for anionically preparing polymers of 1,3-pentadiene from a distillation cut available as a by-product of crude oil cracking operations, said distillation cut being a mixture of saturated and unsaturated hydrocarbon molecules, at least 50 percent by weight of said molecules having five carbon atoms per molecule, said mixture comprising cis-1,3-pentadiene, trans-1,3-pentadiene, cyclopentadiene and other 5-carbon atom molecules, the method comprising contacting, in an inert atmosphere, said mixture of saturated and unsaturated hydrocarbon molecules with an amount of an anionic polymerization initiator selected from the group consisting of alkali metal-polycene complexes and addition compounds of an alkali metal with alpha-methylstyrene, the amount being sufficient to (a) inactivate generally all (1) cyclopentadiene, (2) active hydrogen compounds and (3) other compounds having a chain terminating functionality which are present in the mixture of saturated and unsaturated hydrocarbon molecules, and (b) initiate polymerization of the cis- and trans-1,3-pentadiene contained in said mixture.

32. A polymer of 1,3-pentadiene, said polymer having polymerized therein three constitutional repeating units:

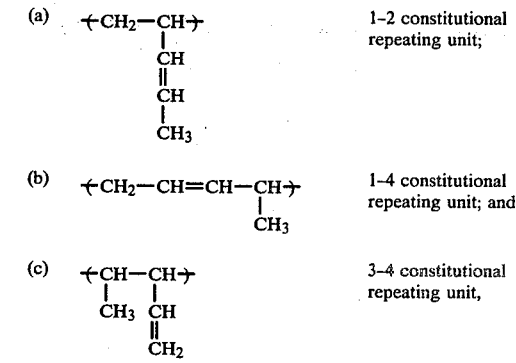

said constitutional repeating units being present in amounts based on total amount of constitutional repeating units as follows (a) from about 40 to about 56 percent, (b) from about 6 to about 14 percent, and (c) from about 37 to about 47 percent.

33. A polymer of 1,3-pentadiene, said polymer having polymerized therein three constitutional repeating units:

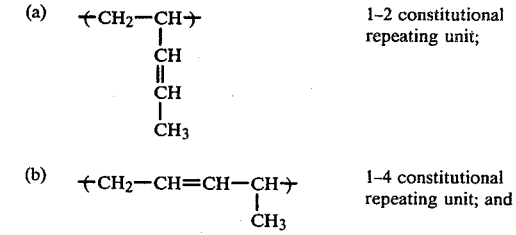

-continued (c) 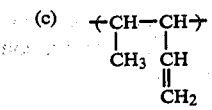 3-4 constitutional repeating unit, said constitutional repeating units being present in amounts based on total amount of constitutional repeating units as follows (a) from about 55 to about 63 percent, (b) from about 10 to about 16 percent, and (c) from about 23 to about 31 percent.

34. A hydrogenated polymer of 1,3-pentadiene, said hydrogenated polymer having polymerized therein three constitutional repeating units:

(a) 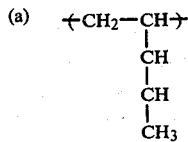 1-2 constitutional repeating unit;

(b) 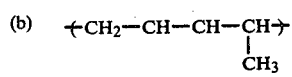 1-4 constitutional repeating unit; and

-continued (c) 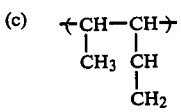 3-4 constitutional repeating unit, said constitutional repeating units being present in amounts based on total amount of constitutional repeating units as follows (a) from about 40 to about 56 percent, (b) from about 6 to about 14 percent, and (c) from about 37 to about 47 percent.

35. A hydrogenated polymer of 1,3-pentadiene, said hydrogenated polymer having polymerized therein three constitutional repeating units:

(a) 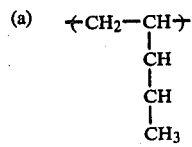 1-2 constitutional repeating unit;

(b) 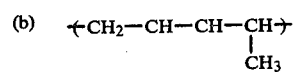 1-4 constitutional repeating unit; and (c) 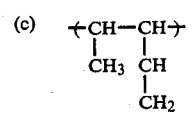 3-4 constitutional repeating unit, said constitutional repeating units being present in amounts based on total amount of constitutional repeating units as follows (a) from about 55 to about 63 percent, (b) from about 10 to about 16 percent, and (c) from about 23 to about 31 percent.

* * * * *